(12) United States Patent
Feher

(10) Patent No.: US 7,035,344 B2
(45) Date of Patent: Apr. 25, 2006

(54) ULTRA EFFICIENT MODULATION AND TRANSCEIVERS

(76) Inventor: Kamilo Feher, 44685 Country Club Dr., El Macero, CA (US) 95618

( * ) Notice: Subject to any disclaimer, the term of this patent is extended or adjusted under 35 U.S.C. 154(b) by 1198 days.

(21) Appl. No.: 09/732,953

(22) Filed: Dec. 7, 2000

(65) Prior Publication Data

US 2001/0016013 A1    Aug. 23, 2001

Related U.S. Application Data

(63) Continuation of application No. 09/385,693, filed on Aug. 30, 1999, now Pat. No. 6,198,777.

(60) Provisional application No. 60/098,612, filed on Aug. 31, 1998.

(51) Int. Cl.
*H03K 7/06* (2006.01)

(52) U.S. Cl. ...................................... 375/271

(58) Field of Classification Search ................ 375/216, 375/238, 259, 295, 360, 219, 220, 356; 327/100, 327/124, 143, 144, 145; 341/143; 713/400, 713/501
See application file for complete search history.

(56) References Cited

U.S. PATENT DOCUMENTS

| | | | |
|---|---|---|---|
| 3,944,926 A | 3/1976 | Feher | 325/38 R |
| 4,103,234 A | 7/1978 | Frazier, Jr. | 325/38 A |
| 4,339,724 A | 7/1982 | Feher | 328/164 |
| 4,350,879 A | 9/1982 | Feher | 235/92 |
| 4,403,331 A | 9/1983 | Halpern et al. | 375/37 |
| 4,517,679 A | 5/1985 | Clark et al. | 375/37 |
| 4,530,088 A | 7/1985 | Hamstra et al. | 370/110.1 |
| 4,567,602 A | 1/1986 | Kato et al. | 375/60 |
| 4,644,565 A | 2/1987 | Seo et al. | 375/60 |
| 4,713,841 A | 12/1987 | Porter et al. | 455/608 |
| 4,720,839 A | 1/1988 | Feher et al. | 375/18 |
| 4,730,344 A | 3/1988 | Saha | 375/53 |
| 5,327,455 A | 7/1994 | DeGaudenzi et al. | 375/1 |
| 5,365,547 A | 11/1994 | Marinaro | 375/106 |
| 5,491,457 A | 2/1996 | Feher | 332/103 |
| 5,682,390 A | 10/1997 | Housako et al. | 371/21.3 |
| 5,719,899 A | 2/1998 | Thielecke et al. | 375/206 |
| 5,729,570 A | 3/1998 | Magill | 375/206 |
| 5,732,114 A | 3/1998 | Thebault et al. | 375/368 |
| 5,784,402 A | 7/1998 | Feher | 375/200 |
| 5,786,778 A | 7/1998 | Adams et al. | 341/61 |
| 5,790,588 A | 8/1998 | Fukawa et al. | 375/200 |
| 5,892,798 A | 4/1999 | Finkenbeiner et al. | 375/305 |
| 6,111,532 A * | 8/2000 | Hirano et al. | 341/143 |
| 6,198,777 B1 | 3/2001 | Feher | |
| 6,430,695 B1 * | 8/2002 | Bray et al. | 713/501 |
| 6,445,749 B1 | 9/2002 | Feher | |

(Continued)

FOREIGN PATENT DOCUMENTS

CA     1130871     8/1982

(Continued)

OTHER PUBLICATIONS

U.S. Appl. No. 10/205,478, filed Jul. 24, 2002, Feher.

(Continued)

*Primary Examiner*—Don N. Vo

(57) ABSTRACT

Ultra Efficient Modulation-Demodulation (modem) and Transmitters-Receivers (transceivers) for high spectral efficient signal generation and processing methods and implementations. Embodiments include Clock Modulated (CM) and Shaped Clocked (SC) transceivers designated as Feher Keying (FK), Feher Quadrature Shift Keying (FQPSK) and Feher Quadrature Modulation (FQAM). In the FK modulator, clock converted and clock shaped signals are processed and generated. These are based on the input data signal patterns.

2 Claims, 15 Drawing Sheets

U.S. PATENT DOCUMENTS

| | | |
|---|---|---|
| 6,470,055 B1 | 10/2002 | Feher |
| 6,665,348 B1 | 12/2003 | Feher |
| 6,757,334 B1 | 6/2004 | Feher |

FOREIGN PATENT DOCUMENTS

| | | |
|---|---|---|
| CA | 1211517 | 9/1986 |
| CA | 1265851 | 2/1990 |

OTHER PUBLICATIONS

U.S. Appl. No. 10/831,562, filed Apr. 23, 2004, Feher.
U.S. Appl. No. 10/831,724, filed Apr. 24, 2004, Feher.
U.S. Appl. No. 60/615,678, filed Oct. 5, 2004, Feher.
3GPP TS 05.04 V8.4.0 (Nov. 2001) Technical Specification Group GSM/EDGE Radio Access Network; Digital cellular telecommunications system (Phase 2+); Modulation (Release1999); 3GPP:3$^{rd}$ Generation Partnership Project; (10 pages).
Furuscar, A. et al .: EDGE: Enhanced Data Rates for GSM and TDMA/136 Evolution IEEE Personal Communications, Jun. 1999, (an IEEE Magazine); pp:56-66.
Brown, C., Feher, K: "A reconfigurable modem for increased network capacity and video, voice, and data transmission over GSM PCS", IEEE Transactions on Circuits and Systems for Video Technology, pp:215-224; vol.: 6, No. 2, Apr. 1996 (10pages).
Brown, C.W.: New Modulation and Digital Synchronization Techniques for Higher Capacity Mobile and Personal Communications Systems Ph.D. Thesis University of California, Davis, Nov. 1, 1996 pp:i-vii;138-190; 269-272; 288-289;291.
Brown, C., Feher, K. : "A Flexible Modem Structure for Increased Network Capacity and Multimedia Transmission in GSM PCS", Proceedings of the Fifteenths Annual Joint Conference of the IEEE Computer and Communication Societies (INFOCOM '96), 1996 (8 pages).
3GPP TS 25.213 V6.0.0 (Dec. 2003) 3$^{rd}$ Generation Partnership Project ; Technical Specification Group Radio Access Network Spreading and Modulation (FDD) (Release 6) 28 pages.
Schell, S.V.: "Implementation Effects on GSM's EDGE Modulation", Tropian Inc., Cupertino CA 95014- the date of this Tropian Inc. document is not known to applicant; 11 pages.On the cover page of the presentation of this report is printed Feb. 22, 2000.
Lin, J.S., Feher, K.: "Ultra Spectrally Efficient Feher Keying (FK) Developments" Proceedings of the European Telemetry Conference Germany , May 2002 9 pages.
Feher, K.: *Wireless Digital Communications: Modulation Spread Spectrum*. Prentice Hall, 1995.
Feher, K.: *Digital Communications: Satellite/Earth Station Engineering*. Prentice Hall, 1983. Available from Crestone Engineering -Noble Publishing, 2245 Dillard Street, Tucker, Georgia 30084.
Feher, K.: *Advanced Digital Communications: Systems and Signal Processing*. Prentice Hall, 1987. Available from Crestone Engineering -Noble Publishing, 2245 Dillard Street, Tucker, Georgia 30084.
Feher, K.: *Digital Communications: Microwave Applications*. Prentice Hall 1981. Since 1997 available from Crestone Engineering -Noble Publishing, 2245 Dillard Street, Tucker, Georgia 30084.
Feher, K. and Engineers of Hewlett-Packard: *Telecommunications Measurements, Analysis, and Instrumentation*: Prentice Hall 1987 .Since 1997 reprints have been available from Crestone Engineering -Noble Publishing, 2245 Dillard Street, Tucker, Georgia 30084.
Feher, K., Emmenegger, H.: "FQPSK Use for Electronics News Gathering (ENG), Telemetry and Broadcasting", *Proc. of the National Association of Broadcasters* NAB'99 Broadcast Engineering Conference, Las Vegas, Apr. 19-22, 1999.
Feher, K.: "FQPSK Doubles Spectral Efficiency of Operational Systems: Advances, Applications, Laboratory and Initial Air-to-Ground Flight tests" (Date of Submission: Aug. 14, 1998). *Proc. of the International Telemetry Conference*, ITC-98 ITC/USA 98, San Diego, CA, Oct. 26-29, 1998.
W. Gao, S.H. Wang, K. Feher: "Blind Equalization for FQPSK and FQAM Systems in Multipath Frequency Selective Fading Channels," *Proc. Intenat. Telemetry Conf.* ITC/USA'99, Oct. 25-28, 1999, Las Vegas, NV.
Terziev, G., Feher, K.: "Adaptive Fast Blind Feher Equalizers (FE )for FQPSK," *Proc. Of the International Telemetry Conference* ITC/USA'99, Oct. 25-28, 1999, Las Vegas, Nevada.
Feher, K.: "FQPSK Transceivers Double the Spectral Efficiency of Wireless and Telemetry Systems" *Applied Microwave & Wireless Journal*, Jun. 1998.
Seo, J-S. and K. Feher: "Bandwidth Compressive 16-State SQAM Modems through Saturated Amplifiers," *IEEE Radio Commun., ICC* '86, Toronto, Jun. 1986.
Kato, S. and K. Feher: "XPSK: A new cross-correlated PSK," *IEEE Trans. Com.*, May 1983.
Law, E.L., U.S. Navy: "Robust Bandwidth Efficient Modulation" *European Telemetry Conference, ETC-98*, Germany, May 1998.
Feher, K.: "FQPSK Doubles the Spectral Efficiency . of Operational Telemetry Systems," *European Telemetry Conference, ETC-98*, May 1998, Germany.
Do, G. and K. Feher: "FQPSK-GMSK: Wirless System Tests and ACI Environment," *Proc. of Wireless Symposium*, Santa Clara, CA, Feb. 9-13, 1998.
Law, E. and K. Feher: "FQPSK versus PCM/FM for Aeronautical Telemetry Applications; Spectral Occupancy and Bit Error Probability Comparisions" *Proc. of ITC-97*, Las Vegas, Oct. 1997.
Feher, K "FQPSK Doubles Spectral Efficiency of Telemetry: Advances and Initial Air to Ground Flight Tests," ITC/USA 98, *Proc. of the Internat. Telemetry Conference*, San Diego, Oct. 1998.
Law, E. and K. Feher: "FQPSK versus PCM/FM for Aeronautical Telemetry Applications; Spectral Occupancy and Bit Error Probability Comparisons," *Proc. of the Internat. Telemetry Conf.*, Las Vegas, Nevada, Oct. 27-30, 1997.
Martin, W.L., T-Y. Yan, L.V. Lam: "Efficient Modulation Study at NASA/JPL," *Proc. of the Tracking, Telemetry & Command Systems Conference*, European Space Agency (ESA), Jun. 1998.
Law, E.L., ITC-98 Session Chair: "RCC Alternate Standards and IRIG106 update," Briefings by DoD during ITC/USA 98 *Internat. Telemetry Conference*, San Diego, Oct. 1998.
K. Feher: "FQPSK Doubles Spectral Efficiency of Operational Systems: Advances, Applications, Laboratory and Initial Air to Ground Flight Tests", File: ITC.98.Final Paper. Rev. 5. Aug. 14, 1998 (Date of Subission) for publication in *the Proc. of the International Telemetering Conference*, ITC-98; San Diego, Oct. 26-29, 1998.

Simon, M.K, Yan, T.Y. "Performance Evaluation and Interpretation of Unfiltered Feher-Patented Quadrature Phase-Shift Keying (FQPSK)," California Institute of Technology, JPL-NASA publication, *TMD Progress Report 42-137*, Pasadena, CA, May 15, 1999.

Winter, J.H. : "Adaptive Antenna Arrays for Wireless Systems," *Tutorial Notes presented/distributed at the 1999 IEEE Vehicular Technology Conference*, Houston, TX, May 15, 1999.

* cited by examiner

ULTRA EFFICIENT MODULATION AND TRANSCEIVERS

This application is a continuation of application Ser. No. 09/385,693 filed Aug. 30, 1999 now U.S. Pat. No. 6,198,777, which claims the benefit under 35 USC 119(e) of U.S. provisional application Ser. No. 60/098,612 filed Aug. 31, 1998.

RELATED APPLICATIONS

This application claims the benefit under 35 U.S.C.119(e) of U.S. Provisional Patent Application Ser. No. 60/098,612 entitled "FK Modulation and Transceivers Including Clock Shaping Processors" filed 31 Aug. 1998 [Ref. PP6]; and incorporated herein by reference.

Other related U.S. patent applications are co-pending U.S. Utility patent application Ser. No. 09/111,723 filed 8 Jul. 1998 and entitled Transceivers including Continuous and Burst Operated TDMA, FDMA, Spread Spectrum CDMA, WCDMA and CSMA by Feher, K. [Ref. PP1].

U.S. Utility patent application Ser. No. 09/370,361 filed 9 Aug. 1999 by inventor Feher, K. entitled FEHER'S QUADRATURE PHASE SHIFT KEYING (FQPSK) TRANSCEIVER AND METHOD FOR TRANSMITTING, RECEIVING AND PROCESSING SIGNALS THEREWITH [Ref. PP2].

U.S. Utility patent application Ser. No. 09/370,360 filed 9 Aug. 1999 by inventor Feher, K. entitled SPECTRALLY EFFICIENT FQPSK, FGMSK AND FQAM FOR ENHANCED PERFORMANCE CDMA, TDMA, GSM, OFDM AND OTHER SYSTEMS [Ref. PP3]; and incorporated herein by reference.

U.S. Utility patent application Ser. No. 09/370,362 filed 9 Aug. 1999 by inventor Feher, K. entitled RECEIVERS AND DEMODULATORS FOR QUADRATURE MODULATED FQPSK, FGMSK AND FQAM SIGNALS [Ref. PP4]; and incorporated herein by reference.

International Patent Application Ser. No. PCT/US99/17995 filed 9 Aug. 1999 by inventor/applicant Feher, K. entitled EFFICIENT SPECTRAL SAVING FQPSK AND FQAM SIGNAL TRANSMISSION AND RECEPTION SYSTEMS [Ref. PP5].

FIELD OF THE INVENTION

This invention pertains generally to signal transmitter and receiver systems, and more particularly to spectrally efficient modulation and demodulation systems, baseband processing systems, and to intermediate and radio (IF and RF) signal generation and processing methods and systems including clock modulated and shaped clocked transmitters and receivers.

BACKGROUND OF THE INVENTION

The most important objectives of wireless communications, broadcasting, telemetry, infrared and in general "radio" systems as well as "wired" systems include: power and bandwidth or spectrum efficiency combined with robust Bit Error Rate (BER) performance in a noisy and/or strong interference environment. These Radio Frequency (RF) system objectives are specified in numerous systems including wireless communications and cellular systems, satellite systems, mobile and telemetry systems, broadcasting systems, cable, fiber optics and practically all communication transmission systems. Here we are using the term "Radio Frequency" (RF) in its broadest sense, implying that we are dealing with a modulated signal. The RF could be, for example, as high as the frequency of infrared or fiber optic transmitters; it could be in the GHz range, e.g., between 1 GHz and 300 GHz, or it could be in the MHz range, e.g. between about 1 MHz and 999 MHz or just in the kHz range. The term RF could even apply to Quadrature Modulated (for short "QM" or "QMOD") Base-Band (BB) signals.

The cited publications-references [1–24], patents [P1–P10], and the references within the aforementioned publications contain definitions and descriptions of many terms used in this new patent disclosure and for this reason these "prior art" terms and definitions will be only briefly, on a case by case basis highlighted. Robust or high performance BER specifications and/or objectives are frequently expressed in terms of the required BER as a function of Energy per Bit (Eb) divided by Noise Density (No), that is, by the BER=f(Eb/No) expression. Cost, reduced size, compatibility and interoperability/compatibility with other conventional or previously standardized systems, also known as "legacy systems," are highly desired. Several standardization organizations have adopted modulation techniques such as conventional Binary Phase Shift Keying (BPSK), Quadrature Phase Shift Keying (QPSK), Offset Quadrature Phase Shift Keying (OQPSK), also designated as Staggered Quadrature Phase Shift Keying (SQPSK) and pi/4-QPSK techniques including differential encoding variations of the same. See publications [1–23] and referenced patents [P1–P8]. For spectrally or spectrum efficient (i.e., bandlimited) signaling, these conventional methods exhibit a large envelope fluctuation of the modulated signal, and thus have a large increase in peak radiation relative to the average radiated power. For these reasons such systems are not suitable for Bit Rate Agile (BRA), robust BER performance NLA operated RF power efficient systems. Experimental work, computer simulation, and theory documented in many recent publications indicates that for bandlimited and standardized BPSK, QPSK, OQPSK or SQPSK or pi/4-QPSK, and QAM system specifications, very linear amplifiers are required to avoid the pitfalls of spectral restoration and of BER degradation. Linearized or linear amplifiers are less RF power efficient (during the power "on" state, power efficiency is defined as the transmit RF power divided by DC power), considerably more expensive and/or have less transmit RF power capability, are larger in size, and are not as readily available as NLA amplifiers. The advantages of NLA over Lin amplifiers are even more dramatic at higher RF frequencies, e.g. above 1 GHz for applications requiring low dc voltage, e.g., size "AA" batteries having only 1.5 Volt dc and for high RF modulated power requirements, e.g., transmit RF power in the 0.5 Watt to 100 Watt range.

Published prior art references [P1–P8] and [1–23] include additional background information. These references include descriptions of binary- and multiple-state Transmitter/Receiver (Transceiver) or for short ("TR") systems that are suitable for NLA. These Modems and Transceivers have been designated as first generation of Feher patented Quadrature Shift Keying (FQPSK). For example, in reference [23] published on May 15, 1999 the authors Drs. M. K. Simon and T. Y. Yan of JPL/NASA-Caltech present a detailed study of Unfiltered Feher-Patented Quadrature Phase Shift Keying (FQPSK"). In references [1–21] and patents [P1–P8] numerous first generation FQPSK technology based terms, other than the FQPSK abbreviation/acronym have been used. In addition to FQPSK Transceivers, these first generation systems have also been described and/or defined as: Feher's Minimum Shift Keying (FMSK),
}

Feher's Frequency Shift Keying (FFSK), Feher's Gaussian Minimum Shift Keying (FGMSK), Feher's Quadrature Amplitude Modulation (FQAM) and/or Feher's (F) Modulation/Amplification (FMOD). Additionally terms such as Superposed Quadrature Amplitude Modulation (SQAM), Intersymbol Interference and Jitter Free (IJF) and/or IJF-OQPSK have also been described in Feher et al.'s prior inventions and publications.

In the cited patents and references, among the aforementioned abbreviations, acronyms, designation, terms and descriptions the "FQPSK" abbreviation/term has been most frequently used to describe in most generic terms one or more of these Feher et al., previously described, first generation of Non-Linearly Amplified (NLA) inventions and technologies. The $1^{st}$ and $2^{nd}$ generation of FQPSK systems have significantly increased spectral efficiency and enhanced end-to-end performance as compared to other conventional NLA systems. RF power advantages, robust BER performance and NLA narrow spectrum without the pitfalls of NLA conventional BPSK and DBPSK, QPSK and OQPSK have been attained with these FQPSK systems. The aforementioned modulation and processing methods use data signal shaping methods whereby the data signals, also referred to as data bits, data symbols, signaling elements or signal wavelets, are shaped signals. Systems such as QPSK, FQPSK, QAM and FQAM could be interpreted as two dimensional modulation and transceiver systems whereby the information is contained in the amplitude and in the phase of the data symbols of the Quadrature Modulated (QM) signals.

The RF spectral efficiency of the aforementioned systems for four (4) state modulation systems, such as QPSK, DQPSK, SQPSK and FQPSK, is limited to 2 b/s/Hz, while the spectral efficiency of multi-state or multi-ary systems such as 64 state QAM is limited to 6 b/s/Hz. An increased number of signaling states increases the complexity of a transceiver and increases the required C/N, that is it has a negative impact on the BER=f(Eb/No) performance, as increased C/N requirement and increased Eb/No requirement leads to more expensive and larger transceivers and/or reduced fade margins. Among the highest spectral efficiencies attained with practical QAM type of systems are for 1024 state 1024-QAM systems with a theoretical limit for 1024-QAM of 10 b/s/Hz and practical limit of about 8 b/s/Hz. However, such a relatively high spectral efficiency requires very complex implementations, steep filters and a significantly increased C/N requirement.

Pulse Width Modulation (PWM) and Pulse Duration Modulation methods, described in Peebles's book [8] and in other prior art references, provide the signal information in the width and/or in the duration of the data symbols. However PWM and PDM methods have a very low spectral efficiency, and for this reason have not generally found applications in RF spectral efficient systems. H. R. Walker's patents [P9] and [P10] as well as Walker et al. publications, including [21] and [24] describe information signal transmission methods which could attain ultra high spectral efficiencies of more than 10 b/s/Hz. In one aspect, to the understnading of inventor, the Walker references appear to provide methods whereby the data information content is transmitted in the clock position, clock duration and/or in the location of one of the edges of the clock transitions. The focus in the Walker et al. references is on binary non-shaped two-level Non-Return to Zero (NRZ) and to Return to Zero (RZ) binary synchronous and symmetrical clocks and to embodiments in which the input data has a bit period of M clock periods, and the data bit polarity are phase shift key coded with waveform widths of M/M, M+1/M and M+2/M bit periods wherein M is an even integer greater than 3. Walker also appears to disclose a method for encoding an output encoded non-shaped signal clock incorporating polarity switches encoded at a plurality of time periods which are equal to and fractionally larger than the bit period of the NRZ data signal. In the aforementioned Walker methods the clock signals are not shaped and have the same basic form for the zero and one states respectively i.e., the Walker methods use NRZ or RZ type of symmetrical clock signals.

Some of the fundamental novelties of this Feher Keying (FK) invention, as compared to the aforementioned prior art references including the Walker et al. patents and publications, are briefly highlighted in this paragraph. Methods and implementation strategies and circuits which generate shaped symmetrical and non-symmetrical clock signals, two level and multilevel non-symmetrical clock signals, variable rise and different non-symmetrical fall time and/or other shaped clock signals and asynchronous clock signal information transmission means, where asynchronous clocking is referenced to the incoming data source signals are disclosed. In one of the embodiments of this invention the FK shaped and non-symmetrical format clock signals have different signal shapes for the one (1) state of that for the zero (0) state. The FK processors are also used in conjunction with NLA cross-correlated and Bit Rate Agile (BRA) quadrature FQPSK, FQAM and also non quadrature modem systems and as input drive signals to FM-VCO based systems to SSB to VSB to DSB-SC and in conjunction with conventional QPSK and QAM transceivers.

While the aforementioned issued patents and publications describe material of a background nature, they do not describe or suggest the subject matter of the present patent which provide novel enhanced performance systems and methods having more efficient and simpler bit rate agile and shaped clock modulation and transceiver—demodulation agile/selectable technologies.

Partial List of Relevant Literature

Several references, including United States Patents, International and Foreign Patents, publications, conference proceedings, and other references are identified herein to assist the reader in understanding the context in which the invention is made, some of the distinctions of the inventive structures and methods over that which was known prior to the invention, and advantages of this new invention. No representation is made as to whether the contents of all of the cited references represent prior-art as several of the cited references have a date after the effective filing date (priority date) of this patent application. This list is intended to be illustrative rather than exhaustive.

United States Patents

[P1] U.S. Pat. No. 5,784,402 Issued July 1998 to Feher
[P2] U.S. Pat. No. 5,491,457 Issued February 1996 to Feher
[P3] U.S. Pat. No. 4,720,839 Issued January 1988 to Feher et al.
[P4] U.S. Pat. No. 4,644,565 Issued February 1987 to Seo/Feher
[P5] U.S. Pat. No. 4,567,602 Issued January 1986 to Kato/Feher
[P6] U.S. Pat. No. 4,350,379 Issued September 1982 to Feher
[P7] U.S. Pat. No. 4,339,724 Issued July 1982 to Feher
[P8] U.S. Pat. No. 3,954,926 Issued March 1976 to Feher
[P9] U.S. Pat. No. 4,742,532 Issued May 1988 to Walker

[P10] U.S. Pat. No. 5,185,765 Issued February 1993 to Walker

Foreign Patent Documents
[PF1] Canadian Patent No: 1130871 August 1982.
[PF2] Canadian Patent No: 1211517 September 1986.
[PF3] Canadian Patent No: 1265851 February 1990.

Other Publications
1. Feher, K.: *Wireless Digital Communications: Modulation Spread Spectrum*. Prentice Hall, 1995.
2. Feher, K.: *Digital Communications: Satellite/Earth Station Engineering*. Prentice Hall, 1983. Available from Crestone Engineering—Noble Publishing, 2245 Dillard Street, Tucker, Ga. 30084.
3. Feher, K.: *Advanced Digital Communications: Systems and Signal Processing*. Prentice Hall, 1987. Available from Crestone Engineering—Noble Publishing, 2245 Dillard Street, Tucker, Ga. 30084.
4. Feher, K.: *Digital Communications: Microwave Applications*. Prentice Hall 1981. Since 1997 available from Crestone Engineering—Noble Publishing, 2245 Dillard Street Tucker, Ga. 30084.
5. Feher, K. and Engineers of Hewlett-Packard: *Telecommunications Measurements, Analysis, and Instrumentation*. Prentice Hall, 1987. Since 1997 reprints have been available from Crestone Engineering—Noble Publishing, 2245 Dillard Street, Tucker, Ga. 30084.
6. Feher, K., Emmenegger, H.: "FQPSK Use for Electronic News Gathering (ENG), Telemetry and Broadcasting," *Proc. of the National Association of Broadcasters* NAB'99 Broadcast Engineering Conference, Las Vegas, Apr. 19–22, 1999.
7. Feher, K.: "FQPSK Doubles Spectral Efficiency of Operational Systems: Advances, Applications, Laboratory and Initial Air-to-Ground Flight Tests" (Date of Submission: Aug. 14, 1998). *Proc. of the International Telemetry Conference*, ITC-98 ITC/USA 98, San Diego, Calif., Oct. 26–29, 1998.
8. Peebles: "*Communications Systems Principles*" Addison Wesley, 1979.
9. Terziev, G., Feher, K.: "Adaptive Fast Blind Feher Equalizers (FE) for FQPSK," *Proc. Of Internat. Telemetry Conf.* ITC/USA'99, Oct. 25–28, 1999, Las Vegas, Nev.
10. Feher, K.: "FQPSK Transceivers Double the Spectral Efficiency of Wireless and Telemetry Systems" *Applied Microwave & Wireless Journal*, June 1998.
11. Seo, J-S. and K. Feher: "Bandwidth Compressive 16-State SQAM Modems through Saturated Amplifiers," *IEEE Radio Commun., ICC '86*, Toronto, June 1986.
12. Kato, S. and K. Feher: "XPSK: A new cross-correlated PSK," *IEEE Trans. Com.*, May 1983.
13. Law, E. L., U.S. Navy: "Robust Bandwidth Efficient Modulation" *European Telemetry Conference, ETC*-98, Germany, May 1998.
14. Feher, K.: "FQPSK Doubles the Spectral Efficiency of Operational Telemetry Systems," *European Telemetry Conference, ETC*-98, May 1998, Germany.
15. Do, G. and K. Feher: "FQPSK-GMSK: Wireless System Tests an ACI Environment," *Proc. of Wireless Symposium*, Santa Clara, Calif., Feb. 9–13, 1998.
16. Law, E. and K. Feher: "FQPSK versus PCM/FM for Aeronautical Telemetry Applications: Spectral Occupancy and Bit Error Probability Comparisons" *Proc. of ITC*-97, Las Vegas, October 1997.
17. Feher, K "FQPSK Doubles Spectral Efficiency of Telemetry: Advances and Initial Air to Ground Flight Tests," ITC/USA 98, *Proc. of the Internat. Telemetry Conference*, San Diego, October 1998.
18. Law, E. and K. Feher: "FQPSK versus PCM/FM for Aeronautical Telemetry Applications; Spectral Occupancy and Bit Error Probability Comparisons," *Proc. of the Internat. Telemetry Conf., Las Vegas, Nev., Oct. 27–30, 1997.*
19. Martin, W. L., T-Y. Yan, L. V. Lam: "Efficient Modulation Study at NASA/JPL," *Proc. of the Tracking, Telemetry & Command Systems Conference*, European Space Agency (ESA), June 1998.
20. Law, E. L., ITC-98 Session Chair: "RCC Alternate Standards and IRIG106 update," Briefings by DoD during ITC/USA 98 *Internat. Telemetry Conference*, San Diego, October 1998.
21. Walker, H. R.: "VPSK and VMSK Modulation Transmit Audio and Video at 15 Bits/Sec/Hz," *IEEE Transactions on Broadcast Engineering*, January 1997.
22. K. Feher: "FQPSK Doubles Spectral Efficiency of Operational Systems: Advances, Applications, Laboratory and Initial Air to Ground Flight Tests," File: ITC.98. Final Paper.Rev.5. Aug. 14, 1998 (Date of Submission) for publication in *Proc. of the International Telemetering Conference*, ITC-98; San Diego, Oct. 26–29, 1998.
23. Simon, M. K, Yan, T. Y.: "Performance Evaluation and Interpretation of Unfiltered Feher-Patented Quadrature Phase-Shift Keying (FQPSK)," California Institute of Technology, JPL-NASA publication, *TMD Progress Report* 42–137, Pasadena, Calif., May 15, 1999.
24. Walker, H. R., Stryzak, B., Walker, M. L.: "VMSK Modulation, a Tutorial-Bandwidth Efficiencies of 30 bits./ Sec./Hz," Proceedings of the Sixth Annual WIRELESS Symposium, Santa Clara, Calif., Feb. 9–13, 1998.

SUMMARY OF THE INVFNTION

This invention includes disclosure of new and original power efficient and spectral efficient systems, devices, and technologies, including ultra efficient (including for example, efficiencies of more than 10 b/sHz) systems, devices, and technologies technologies. Inventive methods for generating, processing, and conditioning signals are also provided.

This invention relates to ultra high spectrally efficient Feher Keying (FK) Modulation and Demodulation (Modem), Baseband Processing (BBP), Intermediate Frequency (IF) and Radio Frequency (RF) signal generation and processing methods and implementations, including Clock Modulated (CM) and Shaped Clocked (SC) Transmitters-Receivers (transceivers). New embodiments, which include Feher Quadrature Shift Keying (FQPSK) and Feher Quadrature Modulation (FQAM), in conjunction with CM and SC are also included.

This invention also relates to Bit Rate Agile (BRA) signal processors and particularly to cross-correlated (for short "CC" or "Xcor") signal processors for increasing the RF spectral and RF power efficiency of modulated transmitted signals including digital binary, digital multilevel and analog clock modulated signals operated in linearized (LIN) and in power efficient Non-Linearly Amplified (NLA) systems.

In the FK processor and modulator specified clock, converted and clock shaped signal parameters are generated. These are based on the input data signal patterns and are generated by means of control signals, which are designed in the data input signal interface data signal and/or clock signal encoder units. The specified selectable clock signal parameters include symmetrical and non-symmetrical clock signals, shaped bandlimited continuous clock signal patterns, shaped encoded clock signals, variable rise and fall time clock signals and asynchronous clock signal information transmission means, where asynchronous clocking is referenced to the incoming data source signals.

The FK processors are also used in conjunction with cross-correlated FQPSK quadrature and also non quadrature modem systems as input drive signals to FM VCO based systems to SSB to VSB to DSB-SC to QAM, and to coded systems with adaptive equalized receivers, Non Redundant Error Correction (NEC), pseudo-error monitor systems. The FK systems and FT apparatus comprises entire transceiver structures including LIN (linear) and NLA (Non Linear Amplifier) transmitter receiver, AGC, synchronization and demodulation and post demodulation signal processors.

In this section increased spectral efficiency Feher Keying (FK) Modulation and Demodulation (Modem), Baseband Processing (BBP), Intermediate Frequency (IF) and Radio Frequency (RF) signal generation and processing including Clock Signal Processing and Clock Shaping Processing (CSP) and Feher Transceivers (FT) for spectral saving Linear (Lin) and Non Linear Amplified (NLA) transmitters-receivers (transceivers) are disclosed. Receiver novel, non-obvious implementation means, structures and architectures for FK modulators and FT systems are also described are highlighted. New embodiments, which include Feher Quadrature Shift Keying (FQPSK) in conjunction with CSP, as well as other embodiments, are also described.

In the FK processor and modulator specified clock, converted and clock shaped signal parameters are generated. These are based on the input data signal patterns and are generated by means of control signals, which are designed in the data input signal interface data signal and/or clock signal encoder units. The specified selectable clock signal parameters include symmetrical and non-symmetrical clock signals, shaped bandlimited continuous clock signal patterns, shaped encoded clock signals, variable rise and fall time clock signals and asynchronous clock signal information transmission means, where asynchronous clocking is referenced to the incoming data source signals.

The FK processors are also used in conjunction with cross-correlated FQPSK quadrature and also non-quadrature modem systems as input drive signals to FM VCO based systems to SSB to VSB to DSB-SC to QAM and to coded systems with adaptive equalized receivers, Non Redundant Error Correction (NEC), pseudo-error monitor systems. The FK systems and FT apparatus comprise entire transceiver structures including LIN (linear) and NLA (Non Linear Amplifier) transmitter receiver, AGC, synchronization and demodulation and post demodulation signal processors.

"ULTRA Spectral Efficient" FK modulation methods and Transceivers implementations with Clock Shaping Processing (CSP) also designated as $3^{rd}$ generation FQPSK or "FQPSK-3" with more than 10 b/s/Hs and up to approximately 30 b/s/Hz inventions are described.

Several completely different original novel non-obvious implementations and technologies of FK modulation methods and transceiver technologies, which are substantially different from the classical teachings of communication engineering theories as well from the aforementioned Walker methods are disclosed herein.

DETAILED DESCRIPTION OF EMBODIMENTS OF THE INVENTION

Figure 1:
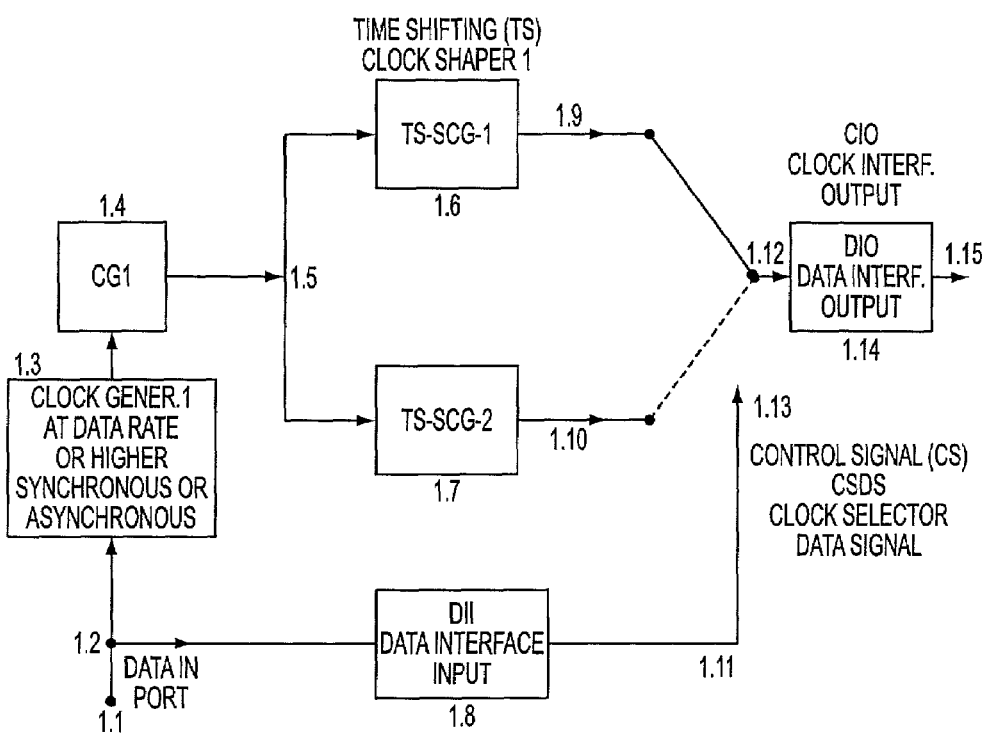
FIG. 1 shows a Clock Generation (CG) processor, two Time Shifting (TS)-Signal Clock Generators (SCG), Data Interface units for Control Signal (CS) Data Signal (DS) clock selection of this invention.

A detailed disclosure of several implementation architectures and embodiments of this invention is contained in the following sections. FIG. 1 shows an embodiment for Feher Keying (FK) modulations by means of Shaped Clock (SC) signals. In this architecture the generated SC signals are symmetrical and/or asymmetrical. Data In Port 1.1 accepts incoming data and/or data and clock or sampling signals. Splitter 1.2 provides the signal and/or clock to units 1.3 and

1.4. Unit 1.3 is a Clock Generator (CG) unit. This unit provides Data rate or higher or lower clock output than the incoming data rate of the signal provided to the input port 1.1. Unit 1.3 provides to Clock Generator (CG1), unit 1.4 an optional clock signal. Units 1.3 and/or Units 1.4 are optional units. The output of 1.3 or of 1.4 is split in splitter unit 1.5 and provided to Units 1.6 and 1.7. The Time Shaping (TS)-or Time Shifting (TS) Signal Clock Generators (SCG) 1 and 2, also designated as TS-SCG units, units 1.6 and 1.7 provide Shaped or Shifted Clock (SC) signals on leads 1.9 and 1.10 to Control Signal (CS) Data Signal (CSDS) selector switch unit 1.12. Signal splitter also provides to Data Interface Input (DII), Unit 1.8 a signal. This unit processes the input data, received from port 1.1 and generates/provides the Control Signal to Selector Switch 1.12 on lead 1.13. The DII unit 1.8, based on the data input pattern generates the CS. In one of the implementations if the data input at port 1.1 is in a high state then the selector switch selects the shaped clock of lead 1.9, while if the data input at port 1.1 is in a low state then CS selects the 1.10 lead. The DII in an other embodiment generates the CS base on the difference between consecutive one or more signal bits present at port 1.1. In a third embodiment the CS generation and selection of lead 1.9 or of lead 1.10 is based on the previous bit pattern and/or digital logic process algorithms implemented in the DII unit 1.8. Switch 1.12 provides the selected Shaped Clock (SC) to the Data Interface Output (DIO) unit 1.14. The DIO unit provides the selected (SC) to the output port 1.15.

Figure 8:
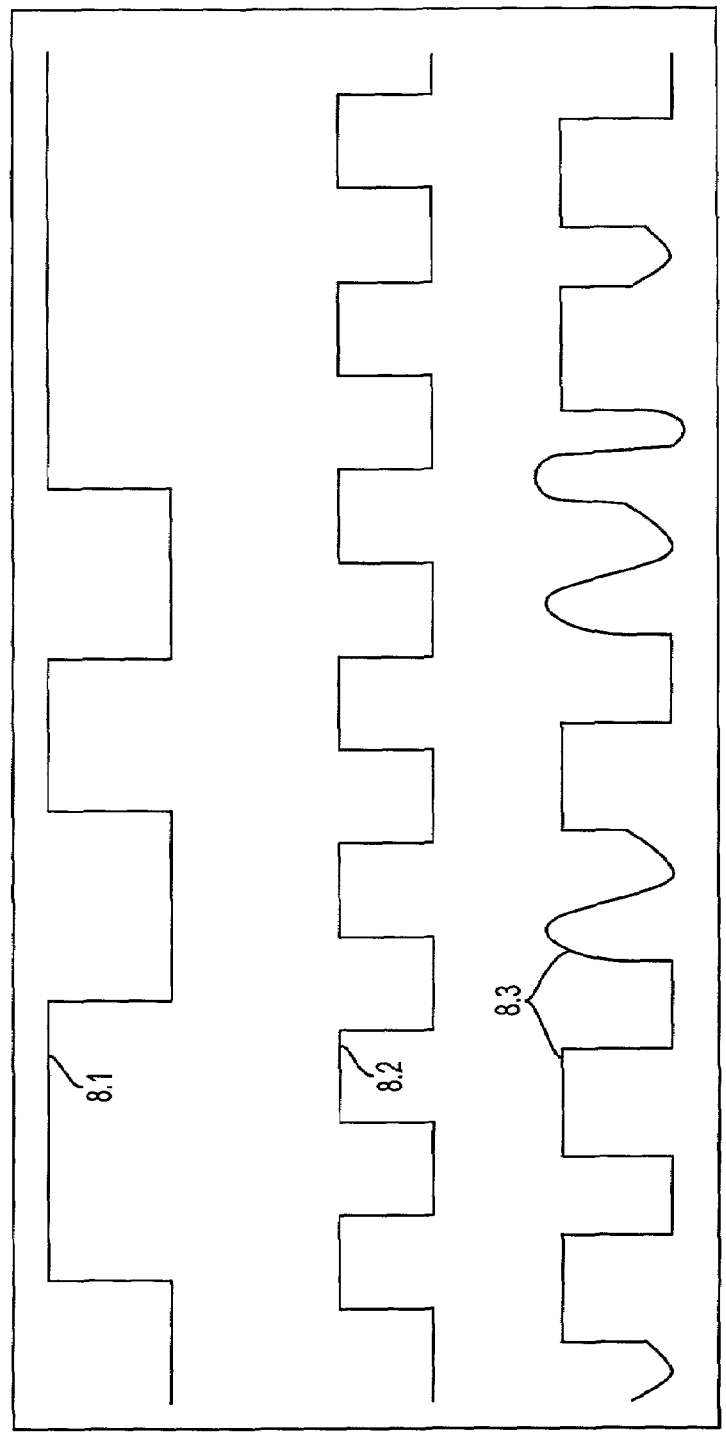
FIG. 8 shows an illustrative Clock Shaped (CS) signal pattern having a sinusoidal and a square wave component as its clock elements.
Figure 9:
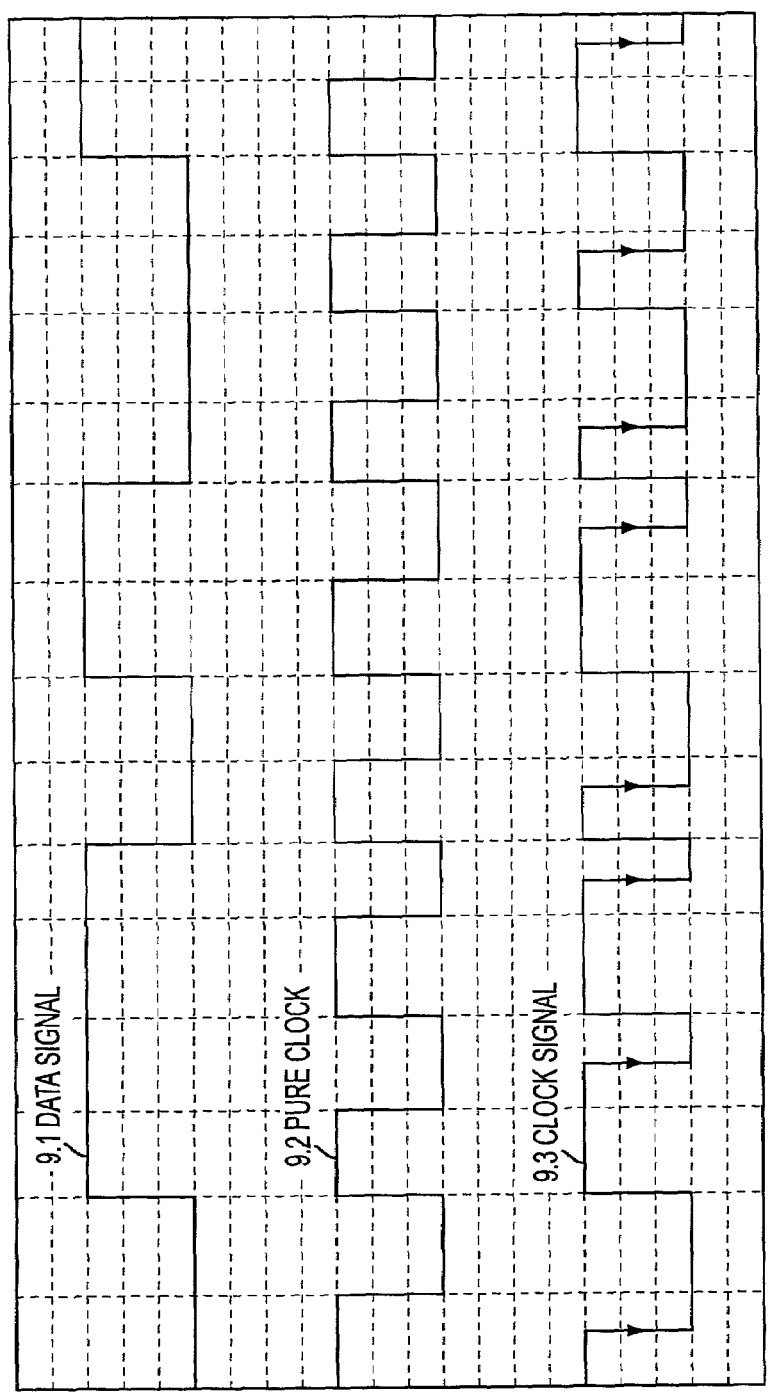
FIG. 9 shows a data pattern generated by one of the embodiments of this invention, having Clock Shaped (CS) information content, whereby one of the clock states has a longer duration while the second clock state has a shorted duration.

Sample data patterns, present at the input port 1.1 are illustrated in FIG. 8 and FIG. 9. In FIG. 8, signal 8.1 is a representative data signal pattern, pattern 8.2 represents a pure clock while pattern 8.3 represents an Asymmetrical Shaped Clock (ASC) pattern. An other embodiment of FIG. 1 processes and generates the sample patterns shown in FIG. 9. In the aforementioned figure Signal 9.1 is an input data signal, pattern 9.2 is a pure clock (the term "pure" implies that the clock is not shaped and or processed by the FIG. 1 embodiment). Signal 9.3 is a processed clock signal generated by one of the embodiments of FIG. 1. The 9.3 Shaped Clock (SC) pattern has a "longer" high state duration for the one state data pattern and it has "shorter" high state duration for the zero state data. Here the terms "longer" and "shorter" are in reference to the usual prior art 50% on and the 50% off duration clock pulse periods.

Figure 2:
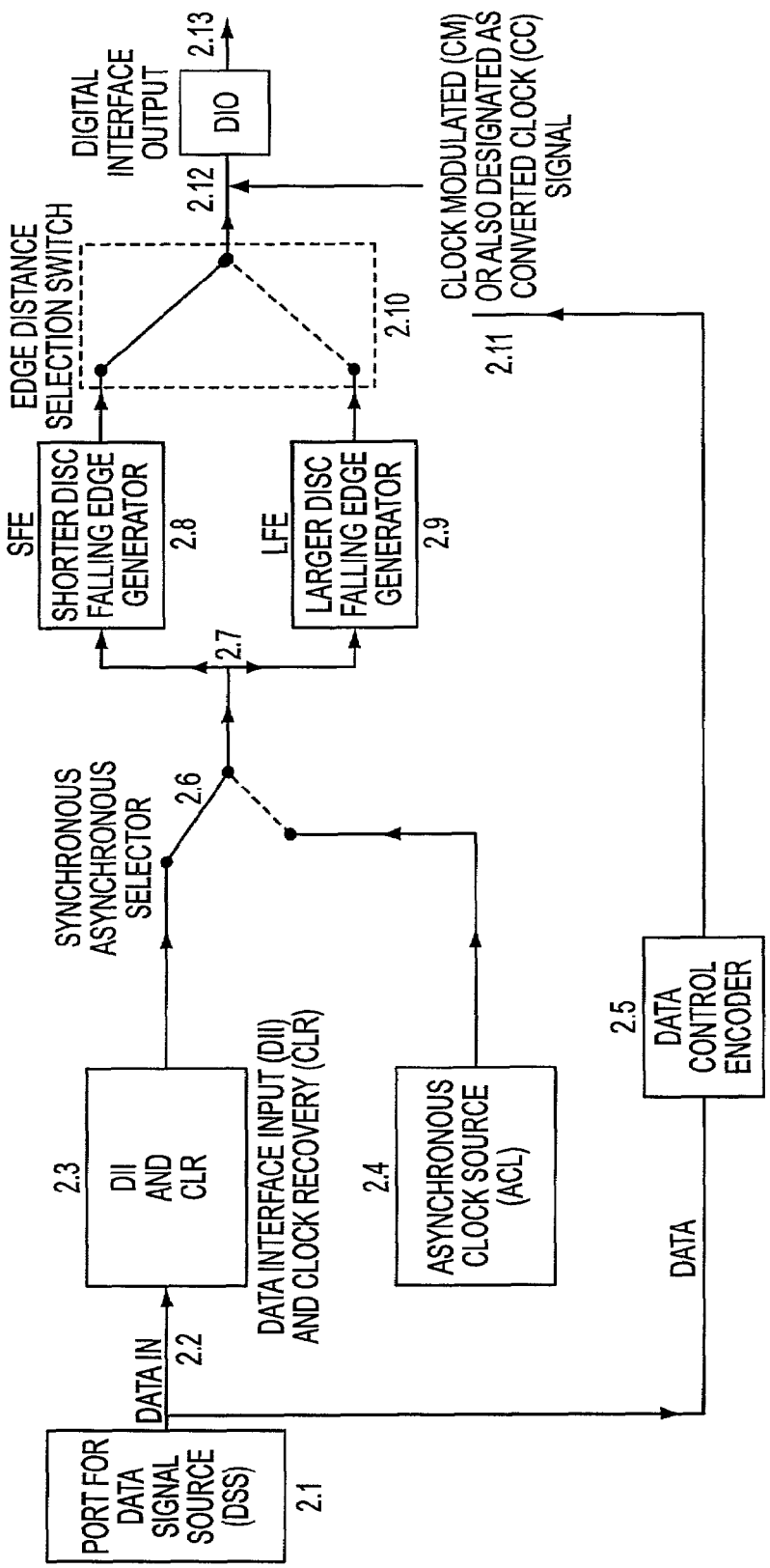
FIG. 2 depicts an alternate implementation of Synchronous Clock Recovery-Clock Generation and of Asynchronous Clock Source (ACS) driven Clock Shaped (CS) baseband signals provided to a selection switch for Clock Modulated (CM) signal transmission.

FIG. 2 the implementation of the transmit part of an alternate Feher Keying (FK) Modulation-Transceiver is shown. The data signal or data information-data signal at the input of the FK processor is connected to the "Data Signal Source (DSS) input port. The port for DSS, Unit 2.1 provides to units 2.3 and 2.5. The Data In signal or Data is provided, to Data Control Encoder (DCE), Unit 2.5. The DCE, provides a control signal to the Edge Distance Selection Switch, Unit 2.10 for selection of the shorter or longer edge distance clock signals provided by units 2.8 and 2.9.

On lead 2.2 the Data In signal is provided to Data Interface Input (DII) and Clock Recovery (CLR) unit 2.3. Unit 2.3 receives on lead 2.2 the data signal and in the CLR part of 2.3 recovers a clock signal from the incoming data stream. The CLR circuit is implemented by one of the many well known prior art CLR circuit designs contained and or referenced in the list of patents and/publications of this disclosure and in other publications. The CLR circuit in one of the implementations generates a Clock Rate (CR) output clock signal having the same rate as the incoming data stream at port 2.1. In this case a synchronous clock, also designated as synchronous equal rate clock with that of the data rate is generated and provided to Selector 2.6. In an other implementation Unit 2.3 is not used. Instead of the DII and CLR, Unit 2.3, an Asynchronous Clock Source (ACL) circuit, Unit 2.4 is used. The ACS circuit is implemented by one of the many well known prior art "free-running oscillator" circuit designs contained and or referenced in the list of patents and/or publications of this disclosure and in other publications. The aforementioned oscillator provides a periodic "clock" signal to the lower input port of Selector 2.6. The ACL generated clock has a sinusoidal shape in a first embodiment, in an second embodiments it has a squarewave clock, in a third embodiment it has a triangular clock, in a fourth embodiment it has a filtered or shaped square wave clock, in a fifth embodiment the ACL generates a multilevel clock signal while in a sixth implementation the ACL provides a processed and filtered multilevel signal to Selector 2.6. In one of the implementations the "Synchronous-Asynchronous Selector, for short Selector, Unit 2.6 is set to select the synchronous clock DII and CLR-Unit 2.3 provided signal, while in an other implementation it is set to select the ACL Unit 2.4 provided asynchronous clock. The selected synchronous or asynchronous clock is provided to clock signal splitter Unit 2.7 for splitting and connecting the aforementioned clock (also designated as "clock signal") to the Shorter Distance Falling Edge Generator (SFE),Unit 2.8 and to the Larger Distance Falling Edge Generator, Unit 2.9. The SFE and LFE generator units process the synchronous or asynchronous clock signal provided by Splitter 2.7 by means of conventional prior art processors and generate SFE and LFE clocks having sample clock patterns illustrated in FIG. 9, in FIG. 10 and FIG. 11 to FIG. 14. The aforementioned SFE and LFE clock signals are provide to the Edge Distance Selection Switch, Unit 2.10 for clock signal selection. The said switch 2.10 provides on lead 2.12 the selected Clock Modulated (CM) (or also designated as Converted Clock (CC) signal to the Digital Interface Output (DIO). The Digital Interface Output (DIO) and Output port 2.13, shown in FIG. 2, provide the processed signal to the transmission medium.

Figure 3:
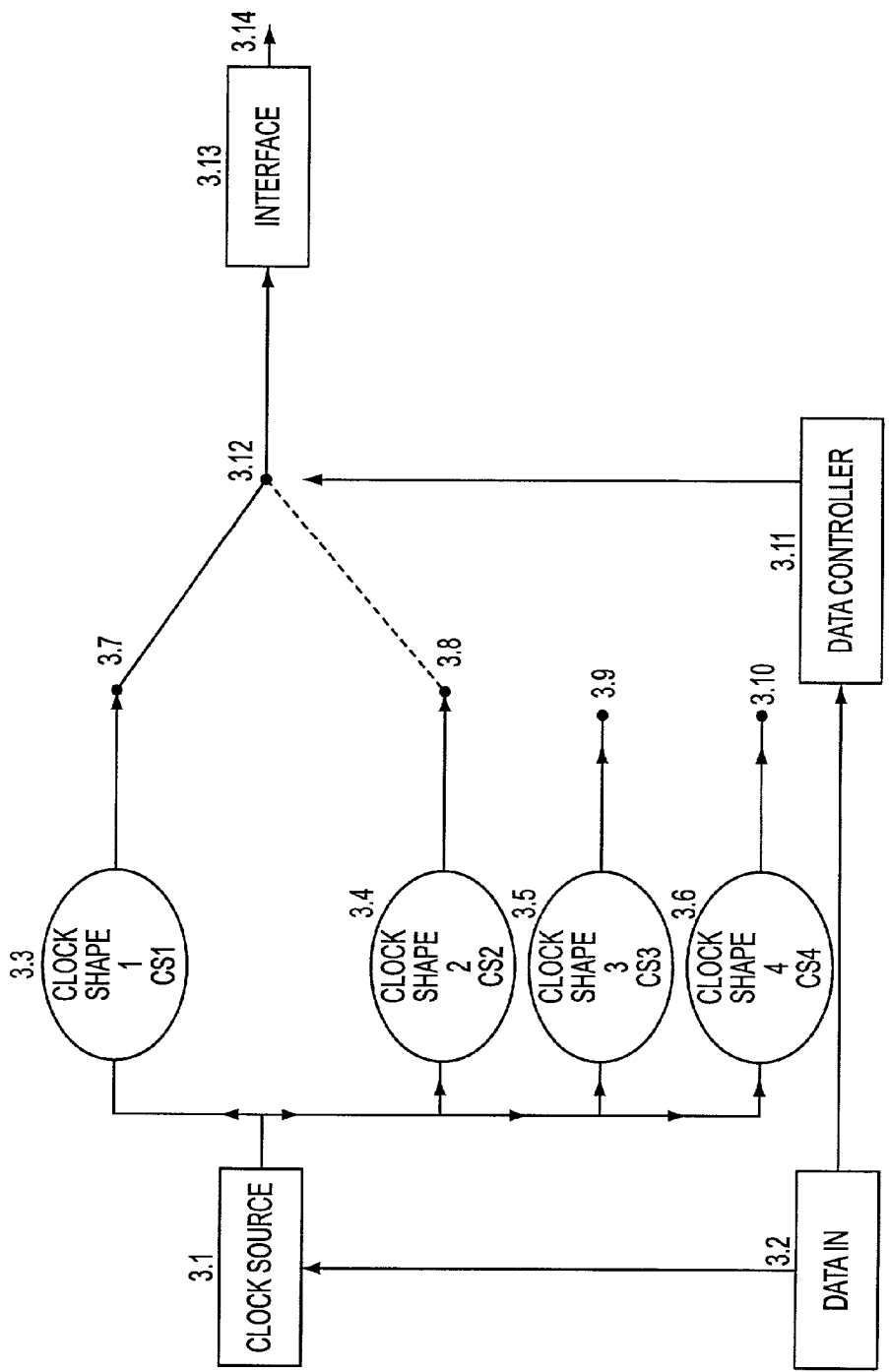
FIG. 3 is an illustration of Plural Clock (PCL) generation and selection for data controlled information-signal transmission.

FIG. 3 shows an other alternate implementation and architecture of the FK transmitter. The Clock Source, Unit 3.1 receives from the Data In port, Unit 3.2 the input signal to be processed in the FK modulator-transmitter. The Data In port provides the Data In signal, in addition to Unit 3.1 also to Data Controller, Unit 3.11. The said Data Controller generates a data control signal and provides it to switch 3.12. The said Data Controller unit comprises conventional logic and/or memory circuits and implements a control signal generation function based on the incoming data pattern. In one of implementations the selector switch 3.12 is selecting one of two clock signals provided at ports 3.7 and 3.8. In an other embodiment the data controller 3.11 provides serial and/or parallel data to switch 3.12 to select and provide to Interface 3.13 and to output port 3.14 one signal from a plurality of Clock Shaped (CS) signals at a specified instant of time. As an other embodiment example four (4) Clock Shaped signal processor/generator circuits, designated as CS1 to CS4 are shown as units 3.3, 3.4, 3.5 and 3.6. The said CS generators have a common input provided by Clock Source 3.1 in one of the embodiments, while in other designs CS1, CS2, CS3 and CS4 have a plurality of dependent or independent, synchronous or asynchronous clock inputs. The CS generators outputs are provided to ports 3.7, 3.8, 3.9, and 3.10 for the design case of four (4) Clock Shaped signal designs. The implemented number of CS processors and generators is at least one, however it could be two, three, four, five and in fact any number. In one of the embodiments the data controller 3.11 compares two consecutive data input signal bits or two consecutive data in symbols and based on the comparison, if the said bits are different it provides a control signal to switch 3.12 to select CS1 and if said consecutive bits are not different, that is they have the same state, then it provides a control signal to switch 3.12 to select CS2. In FIG. 8 a selected clock signal pattern 8.3 is shown. Depending on the signal-in (also designated as Data In) pattern, sample pattern 8.1, the Data Controller 3.11 provided control Signal to switch 3.12, selects the sinusoidal (SIN) or Square Wave (SQ) clock signal element for transmission. The time aligned sequence of the selected said signal elements, forms the shown Clock Modulated (CM) clock data pattern 8.3. The said CM clock data pattern has a different clock signal element, for the one and for the zero Data-In patterns, or for the difference between the consecutive Data-In patterns. The said clock signal elements are also referred herein and designated by terms such as clock signal wavelet or clock wavelet or merely signal element or clock wavelet or wavelet.

A fundamental, truly pioneering original discovery of this invention is described in this part of my patent disclosure. The CM clock pattern 8.3, of FIG. 8, illustrated as a sample result of the embodiment of FIG. 3 shows an asymmetrical clock having different clock signal shapes. The information to be transmitted is contained in the shapes of the clock signals and/or in the different shapes, that is, differences of the clock signal shapes.

In my previous prior art discoveries, more than 300 publications, co-authored papers, books and patents as well as in several thousand other prior art publications and patents the implementations and designs have been focused on signal shaping of symmetrical data signaling elements while in this invention the focus is on signal shaping of clock signaling elements and in particular of asymmetrical and also of symmetrical signaling elements. In the vast majority of prior art systems the data signal elements have been processed, shaped and filtered to reduce the spectrum of the data pattern, while in this invention, in my aforementioned embodiments, including the embodiment of FIG. 3 the clock signals have been shaped. Based on my understanding of the prior art literature, the Walker inventions and publications, including Walker's [P9; P10] and [21] represent an exception as Walker's processors and implementations contain the information in specific symmetric and synchronous clock time-clock edge transitions or specific clock duration/positions. The prior art literature, including Walker inventions do not contain discoveries for asymmetrical binary, synchronous and/or asynchronous binary and/or multilevel information transmission whereby the data content-data information is contained in shaped clock signals.

Figure 4:
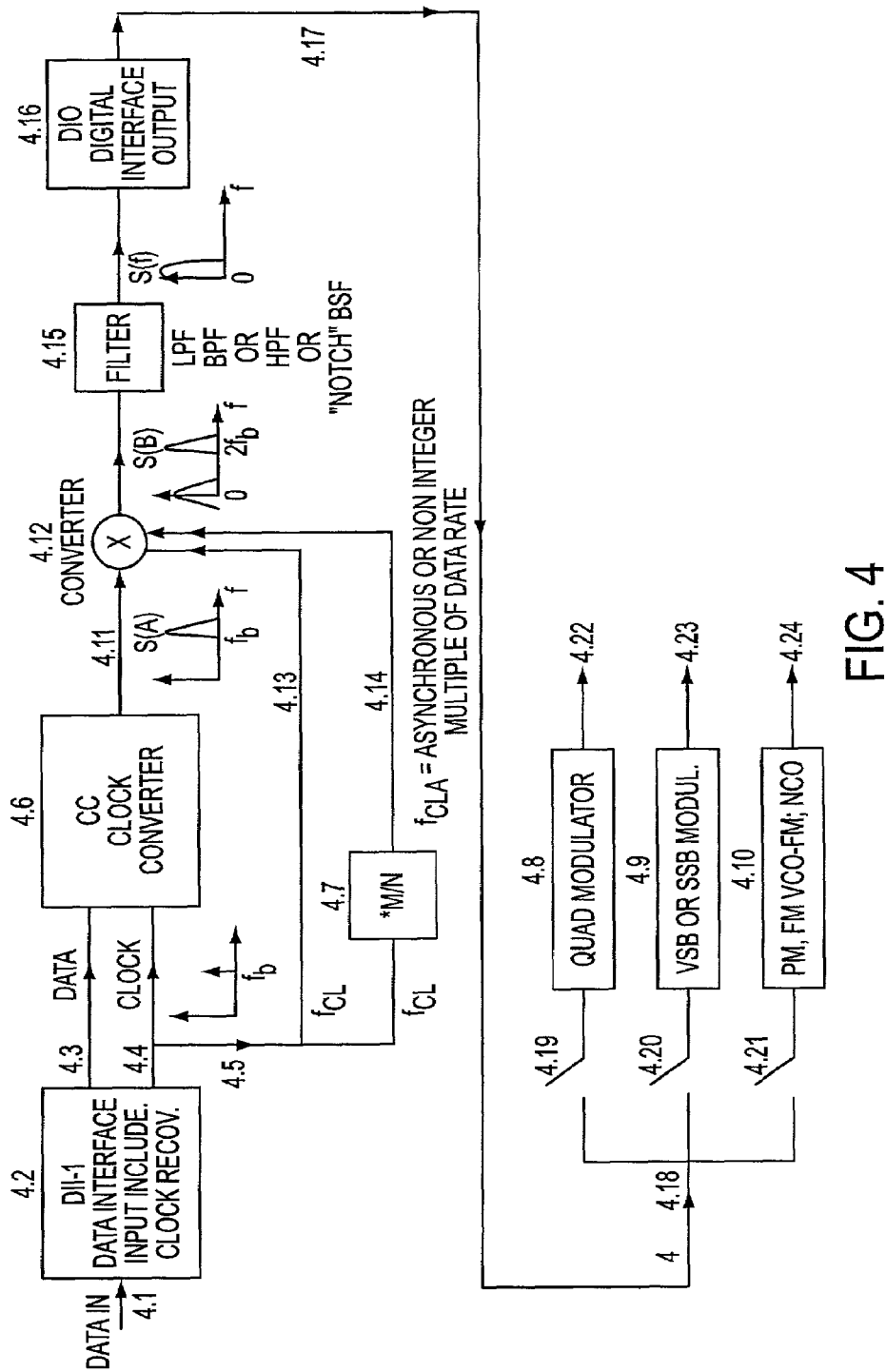
FIG. 4 shows an alternate embodiment which includes optional Quadrature Modulators (QM), PSK or VSB or SSB and PM, FM, QAM or other modulators for transmission of the Clock Modulated (CM) signals.

FIG. 4 shows an other implementation embodiment and architecture of the Feher Keying (FK) Modulator and Transmitter. The Data In signal is provided on lead 4.1 to Data Interface Input (DII) Unit 4.2 The said DII recovers the clock from the Data In signal and generates a synchronous clock signal. In an alternate embodiment instead of a Clock Recovery and/or synchronous clock generator a free-running asynchronous clock generator is implemented. On lead 4.3 the DII processed Data signal is provided, while on lead 4.4 the said clock signal is provided. The Clock Converter, Unit 4.6 Clock Modulates (CM) or clock shapes the pure clock signal and provides synchronous, asynchronous, symmetrical or asymmetrical binary or multiple state clock modulated signals, on lead 4.11 to Converter Unit 4.12. The second and third inputs to said converter are provided on leads 4.13 and 4.14 which provide Clock rate and multiple M/N clock rate or asynchronous rate clock signals to 4.12.

Converter 4.12 shifts the spectrum of the Clock Converted (CC) or Clock Modulated (CM) signal, provided on lead 4.11, based on well established prior art methods. Converter 4.12 is implemented as a conventional multiplier and/or any other prior art analog or digital signal processing device. Following the converted signal output an optional Filter Unit 4.15 is implemented. Unit 4.16, designated as Digital Interface Output (DIO) is implemented in one of the implementations with digital circuits while in an other embodiment with analog circuits, while in a third embodiment with hybrid analog/digital circuits. The DIO output lead 4.17 provides a signal to clock signal splitter 4.18. Switches 4.19, 4.20 and 4.21 are set to select one or more modulators for transmission. Said modulators 4.8, 4.9 and 4.10 are conventional Binary DSB modulators, or Quadrature Modulators, or VSB or SSB modulators or PM, FM, VCO-FM and or Numerically Controlled Oscillator (NCO) modulators. In alternate embodiments, instead of said modulators Feher patented QPSK, known as FQPSK) or Feher patented Gaussian Minimum Shift Keying (GMSK),designated as FGMSK or Feher patented QAM (FQAM) is used. The said modulated signals are provided to one or more output ports 4.22, 4.23, and/or 4.24.

Figure 5:
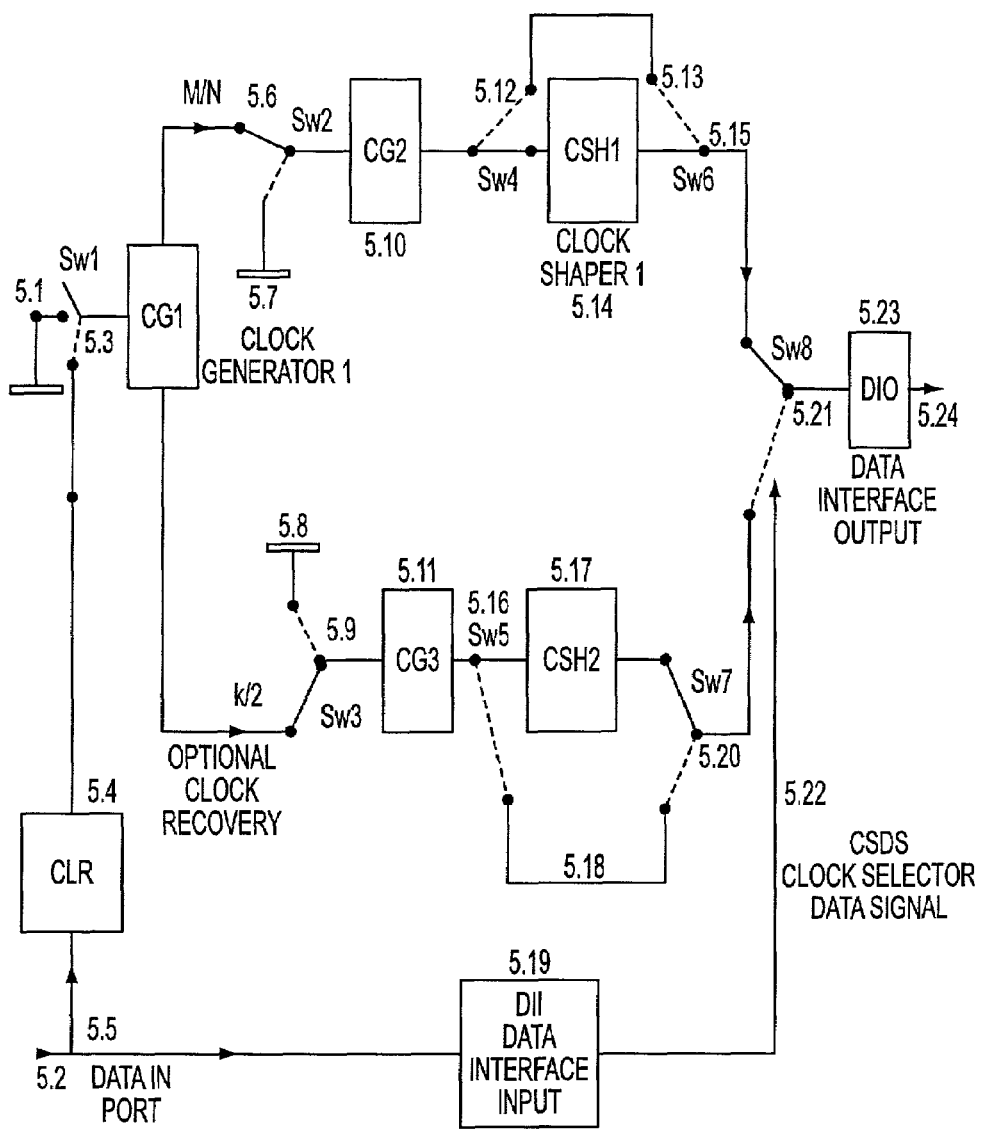
FIG. 5 shows and alternative embodiment of Clock Modulated (CM) baseband signal generation with two Clock Shaper (CS) circuits.

FIG. 5 represents an other alternate implementation of this invention. Instead of having a binary modulated clock, this embodiment includes a multilevel asynchronous and/or synchronous shaped modulated clock implementation embodiment. Data In Port 5.2 provides on lead 5.5 to Clock Recovery (CLR) unit 5.4 and to Data Interface Input (DII), Unit 5.19 signals for further processing. The said CLR circuit is not used in asynchronous CM clock generator embodiments as it is replaced by Clock Generator (CG1) unit 5.3. Said CG1 is optional for the synchronous mode. If Switch (Swl) Unit 5.3 is connected to "Ground", Unit 5.1, then CG1 and the set up is operated in asynchronous mode; if it is connected to lead 5.4 then a synchronous operation is implemented. Switches 5.6 and 5.9 select between signals 5.6, 5.7 (ground),5.8 (ground) and 5.9. Said "Ground" indicates asynchronous or "free-running" mode of the ground input connected clock generators. Clock Generator CG2 and CG3 Units 5.10 and 5.11, as well as Clock Shapers CSH1 and CSH2 Units 5.14 and 5.18, are connected in the main signal path or by-passed (not used-i.e. not implemented) by switch components 5.12, 5.13, 5.16, 5.17 and 5.20. Data Interface Input (DII) Unit 5.19 generates and provides Clock Selector Data Signal (CSDS) on lead 5.22 to Switch (Sw8),Unit 5.21. The selected Clock Modulated Signal is provided to Data Interface Output 5.23 for interface circuit embodiment to output lead 5.24.

Figure 6A:
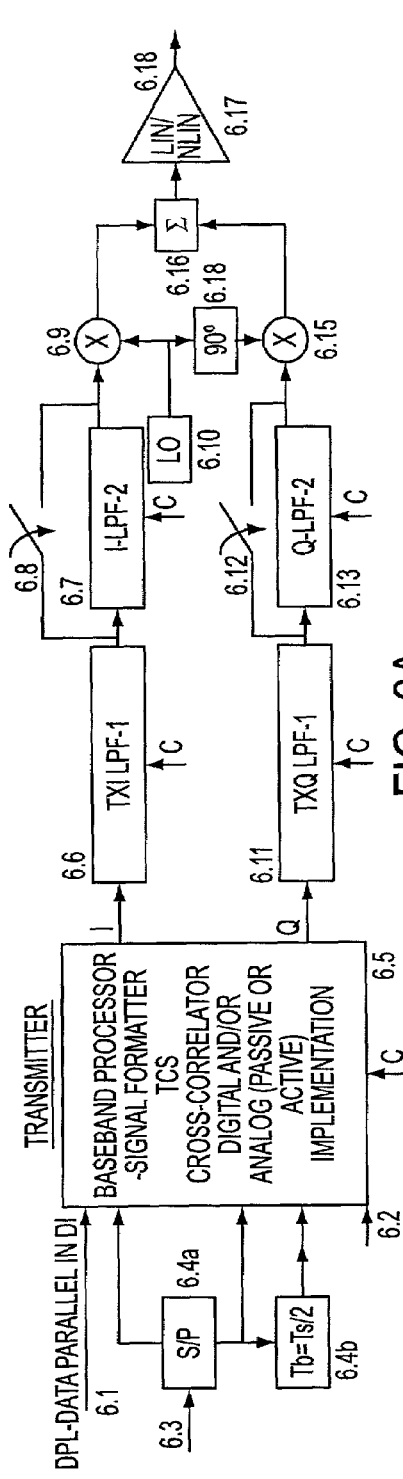
FIG. 6 shows an alternate implementation of an embodiment of a Cross-Correlated Bit Rate Agile (BRA) system.
Figure 6B:
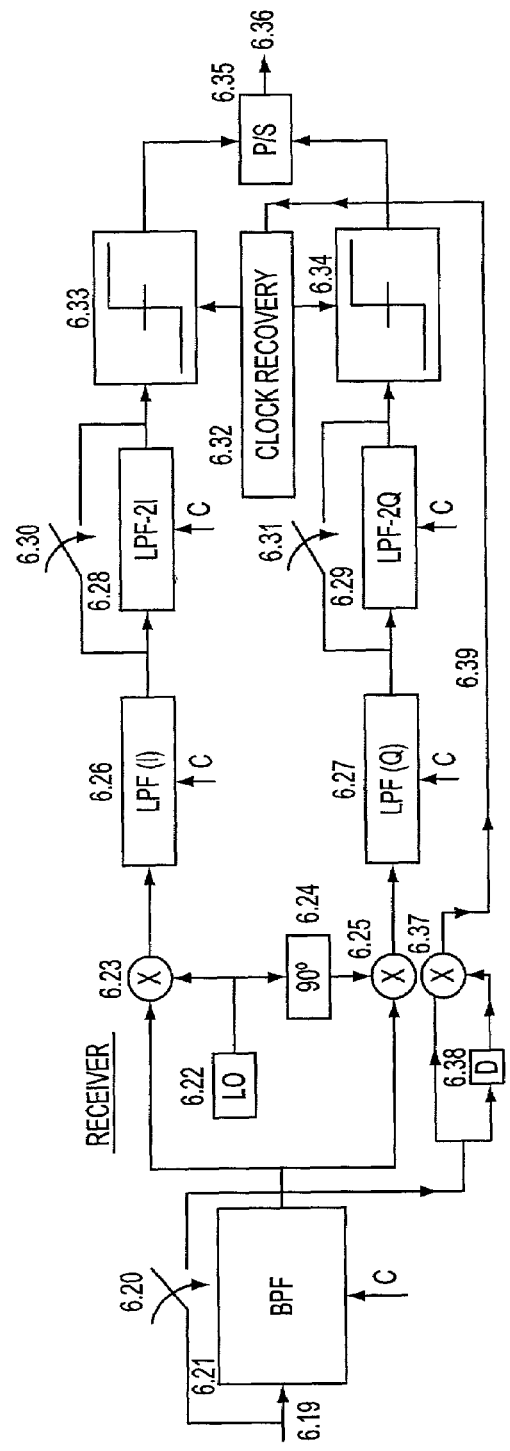
Figure 7:
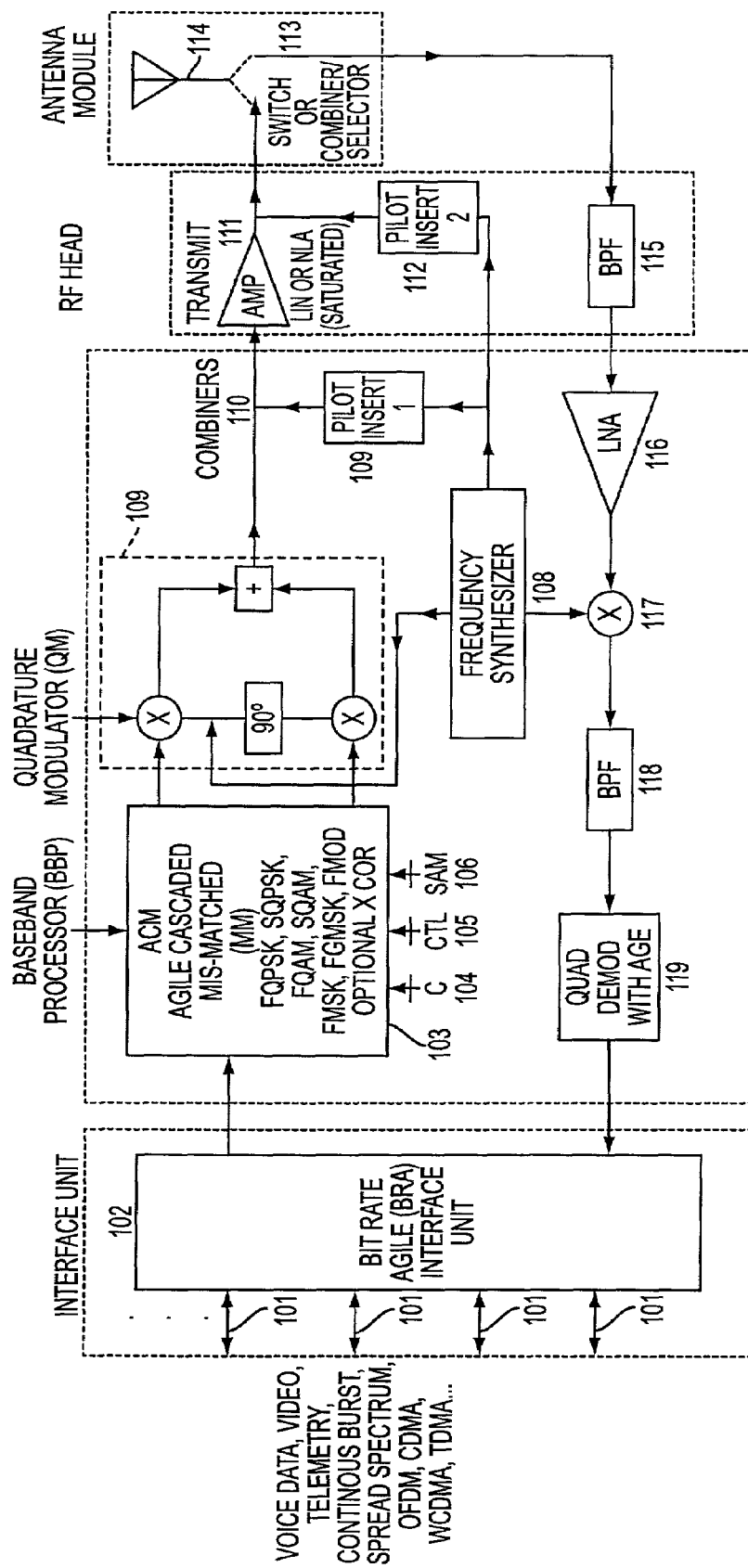
FIG. 7 shows an embodiment for a plurality of input signals for a Quadrature Modulated embodiment of this invention is illustrated, using a Clock Modulated (CM) and Bit Rate Agile (BRA) embodiment.

FIG. 6 and FIG. 7 implementation and embodiment contains components described in Feher's other pending patents K. Feher, Ref.[PP2 to PP5]. A fundamental difference between the Referenced [PP2 to PP5] embodiments, use, design and applications is that the Control Signal 104,CTL and SAM 105 and 106 leads, of this invention, See FIG. 7 contain Clock Modulated Signals and that the data information is processed and transmitted and received, demodulated by processors which contain clock modulation clock shaping and or asynchronous and synchronous binary and multilevel clock modulated signals, described in conjunction with previous figures of this new patent application. In FIG. 6. most or all Clock Signals of this invention contain Clock Modulated (CM) and or Clock Shaped (CS) clock signals, including symmetrical, asymmetrical binary, multilevel and asynchronous signals while in Ref.[PP2 to PP5] pure not shaped not clock modulated clocks are used for clocking-designated as "C" signals or "C" clocks and numerous units of FIG. 6 as well as FIG. 7.

In FIG. 6 an implementation diagram with cascaded switched transmit (Tx) and receive (Rx) Low-Pass-Filters (LPF) in conjunction with cross-correlated and other non cross-correlated TCS response and cascaded LR processors is shown. These LR processors could be implemented as separate I and Q LPF s or as an individual timeshared LPF. The Transmit Baseband Signal Processor (BBP) including the I and Q LPF s could be implemented by digital techniques and followed by D/A converters or by means of analog implementations or a mixture of digital and analog components. External Clock and External Data Signals are used to drive the S/P and the entire baseband processor (BBP). The BBP may include a Differential Encoder (DE). The I and Q LPFs may be implemented as single filters (instead of cascaded filters). Modulation and Demodulation filters have been implemented and tested with intentionally Miss-Matched (MM) filter parameters. LR filters have been synthesized and implemented as phase equalized and non-equalized phase response transmit and receive Bessel, Gaussian, Butterworth and Chebycheff filters. Bessel, Gaussian and Butterworth and Chebycheff filters as well as other classical filters are within the previously described and defined class of Long Response (LR) filters. These filters have a relatively long practical impulse and/or pulse response. The measurable practical pulse response of the aforementioned filters having an approximately BTb=0.5 design parameter extend to many bit durations. Here B refers to the 3 dB cut-off frequency of the filter and Th to the unit bit duration. From classical communications and Nyquist transmission theory it is well known that the theoretical optimal performance minimum signal bandwidth is defined for BTb=0.5. The LPFs in the I and Q channels, or the shared single set of LPFs, implementations include Infinite Impulse Response (IIR) and Finite Impulse Response (FIR) filters.

In FIG. 6 on lead 6.3 a serial data stream is present. This signal is provided to 6.4a and the optional 6.4b units for Serial-to-Parallel (S/P) conversion and a 1 bit duration (Tb) offset in one of the implementations. In other implementations there is no offset delay 6.4b in the embodiment. Some other alternate embodiments use a selecteable offset delay 6.4b which is larger or equal to zero and smaller than the duration of approximately 200 bits. As stated the Offset logic is used in certain embodiments, while in other architectures it is not present. The input signal or input signals are provided on leads 6.1 and 6.2 instead of lead 6.3 in some of the alternative implementations of this invention. Unit 6.5 is a Base-Band Processor. Unit 6.5 may be clocked, controlled and sampled by signals such as C, CTL, and SAMP such as illustrated previously in FIG. 1 to FIG. 3. In this figure, FIG. 6, all of these clocking, control and sampling signals which could represent multiple rates and multiple leads are collectively or individually abbreviated simply as "C" and illustrated with an arrow near the letter "C." Unit 6.5 in some of the embodiments performs the Time Constrained Signal (TCS) processing, waveform assembly and generation functions of multiple symbol TCS cross correlation and signal processing operations. The I and Q outputs of unit 6.5 are provided as inputs to the transmit set of LPFs designated as TX1 LPF-1 unit 6.6 and TXQ LPF-1 unit 6.11. This set of first LPFs could be cascaded with a second set of I and Q channel LPFs units 6.7 and 6.13. Switch units 6.8 and 6.12 illustrate that the second set of LPFs could be bypassed and/or deleted in some of the embodiments.

The LR filter units, embodied by the first and second sets of I and Q are implemented as LPFs or alternately as of other types of filters such as Band-Pass Filters (BPF) or High Pass Filters (HPF) or other filter/processor LR filter combinations. As stated previously, for several embodiments all of the aforementioned processors are BRA, while for other implementations bit rate agility may not be required. Units 6.9, 6.10, 6.14, 6.15 and 6.16 comprise a quadrature modulator in which the I and Q modulators are 90-degree phase shifted and in which a Local Oscillator (LO) is used as a Carrier Wave (CW) generator. Unit 6.17 is an amplifier that could be operated in a LIN or in a NLA mode. The output of amplifier 6.17 is provided on lead 6.18 to the transmission medium.

In FIG. 6 at the receiving end, on lead 6.19, is the received modulated signal. Unit 6.21 is a BPF that is present in some embodiments while in others it is not required. Alternatively the receive BPF could be "switched-in" or "switched-out" by switch 6.20. In some implementations Surface Acoustic Wave (SAW) BBF were used to implement 6.21. Units 6.22, 6.23, 6.24 and 6.25 embody a Quadrature Demodulator (QD) with a corresponding Local Oscillator (LO). The aforementioned LO represents for some embodiments an entire Carrier Recovery (CR) subsystem while for other embodiments it is a free running LO. The set of LPFs 6.26 and 6.27 are the embodiment of postdemodulation filters, while the second set of LPFs 6.28 and 6.29 may be used to further enhance the spectral efficiency advantages or other performance advantages of designed systems. The second set of LPFs could be connected or disconnected by switches 6.30 and 6.31 or entirely deleted. Unit 6.32 is the Clock Recovery (CR) and/or Symbol Timing Recovery (STR) system. For fast clock and/or STR, this unit is connected in some of the embodiments in parallel to the Carrier Recovery (CR) subsystem. In one of the embodiments of fast Clock Recovery (CR) systems, the parallel configuration embodied by units 6.37 and 6.38 is used for discrete signal clock generation. The discrete signal spike, in the frequency domain, provides on lead 6.39 the clock recovery unit 6.32 with a discrete spectral line signal which is exactly at the symbol rate or at the bit rate. In this architecture unit 6.37 is a multiplier or any other nonlinear device which has at its input the received modulated signal and the same received modulated signal multiplied by a delayed replica of itself. The aforementioned delayed replica is generated by unit 6.38, a delay element. The receiver structure, shown in FIG. 6, is one of the many possible alternative receiver and demodulator structures. It is inter-operable compatible and suitable for BRA and MFS and CS reception, demodulation and/or decoding of the transmitted signals embodied by means of the BRA and/or MFS and/or CS implementation of the FIG. 6 transmitter embodiments.

Contrary to the teachings and wisdom of well established communication theory, of matched filter-optimal demodulation theory and optimal data reception theories, in several embodiments of the current invention, substantially Miss-Matched (MM) modulator and the demodulator filters have been implemented. Fundamental and pioneering discoveries, regarding the cascaded pulse response of TCS response and of LR filter cross-correlated BRA implementations of modulator I and Q filters and that of the implementations of "matched" and/or intentionally "Miss-Matched" (MM) demodulator filters are disclosed in this part of the invention. In classical communication theory the demodulation LPFs, and in fact the entire cascaded receiver and demodulation filter responses are matched to the characteristics of the modulator and entire cascaded modulator and RF transmitter filters. The intentionally and substantially Miss-Matched (MM) transmit and receive filter designs, used in implementations of this invention lead to simpler implementations than implied by communication matched filter theory and to substantially improved performance for RF power efficient NLA transceivers. From communications theory, numerous books, referenced publications as well as from patents it is well known that for "optimum" performance the cascaded filters of the modulator should be matched by the cascaded receive demodulator filters. For example, in a conventional bandlimited QPSK system, if Nyquist filters are implemented as "raised cosine filters", then the best "optimal" performance is attained if the cascaded transmit and receive filters have a raised cosine transfer function and the filtering is equally split, i.e. "matched" between the transmitter and receiver. For pulse transmission, such as filtered NRZ data an aperture equalizer, having an wTs/sin(wTs) frequency response is used in theoretical optimal transmitters, prior to the implementation of the transmit matched filter. Specifically, based on Nyquist transmission and filter theories, combined with matched filter receiver theories the 3 dB cut-off frequency of an optimal minimum bandwidth transmit filter, used as a baseband I or Q channel filter, in a QPSK system equals ½ of the symbol rate or alternatively ¼ of the bit rate. The 3 dB bandwidths of the modulator and demodulator filters of the "theoretical optimal" bandlimited QPSK system are matched. The 3 dB bandwidth of the theoretical optimal system it is the same for the modulator filter and for the demodulator filter. If these filters are implemented by premodulation LPFs and post-demodulation LPFs then the aforementioned theoretical bandwidth corresponds to BTs=0.5. This value corresponds to BTb=0.25, where B is the 3 dB bandwidth of the respective filters, Ts is the unit symbol duration and Tb is the unit bit duration.

Contrary to the teachings of the aforementioned optimal performance matched filter modulation demodulation theory, we disclose the implementation of demodulator architectures and embodiments with "Miss-Matched" (MM) filtering. The term Miss-Match (MM) refers to intentional and substantial MM between the cascaded 3 dB bandwidth of the I and Q demodulator filters with that of the cascaded response of the modulator I and Q filters. Alternate embodiments include MM pre-modulation baseband LPF and post-demodulation baseband LPF designs as well as post modulation BPF transmitter implementations and receiver pre-demodulation BPF implementations. A combination of the aforementioned baseband and BPF designs has been also implemented. The term "substantial" MM in a BRA architectures and embodiments such as shown in the FIG. 6 discloses a processor architecture and embodiment of the FK processor. The Data in Port is connected to the Data Interface Input (DII) system, which provides Clock Selector Data Signal (CSDS) to Switch 8 (Sw 8). The DII means determines which Clock Generator (CG) shape signal and Clock Shaper (CSH) is selected, based on the Data Input Pattern and the specific Encoder of the DII. The Data In Port may be connected to an option Clock Recovery (CIR)* system. Clock Generator 1 (CG1) may be free-running as indicated if Switch 1 (Sw1) is connected to Ground. In this case, asynchronous, i.e., non-synchronous, clock generation relative to the Data Input is used. Alternatively, CG1 may operate in synchronism with the Data In Port. The Clock Shaping circuits, CSh1 and CSh2, provide asynchronous or synchronous signals having the same type or completely different type of Shaped Clock Signals to the Data Interface Output (DIO) circuit.

FIG. 7 implementation and embodiment contains components described in Feher's other pending patents K. Feher, Ref. [PP2 to PP5]. A fundamental difference between the Referenced [PP2 to PP5] embodiments, use, design and applications is that the Control Signal 104, CTL and SAM 105 and 106 leads, of this invention (See FIG. 7), contain Clock Modulated Signals and that the data information is processed and transmitted and received, demodulated by processors which contain clock modulation clock shaping and or asynchronous and synchronous binary and multilevel clock modulated signals, described in conjunction with previous figures of this new patent application. In FIG. 6. most or all Clock Signals of this invention contain Clock Modulated (CM) and or Clock Shaped (CS) clock signals, including symmetrical, asymmetrical binary, multilevel and asynchronous signals while in Ref. [PP2 to PP5] pure not shaped not clock modulated clocks are used for clocking-designated as "C" signals or "C" clocks and numerous units of FIG. 6 as well as FIG. 7.

FIG. 8 FK clock modulated sample patterns including Data In pattern, Pure Clock, Clock for 1 state, Clock for 0 state, selected clock-modulated output patterns are illustrated. The specific patterns 8.1, 8.2 and 8.3 were described previously in this applications and for this reason their description will not be repeated here.

In FIG. 9 Clock shaped data patterns following one of the Clock Shaping Processing (CSP) generated by a clock shaped subsystem are illustrated. The specific patterns 9.1, 9.2, and 9.3 were described previously in this application and for this reason their description will not be repeated here.

Figure 10:
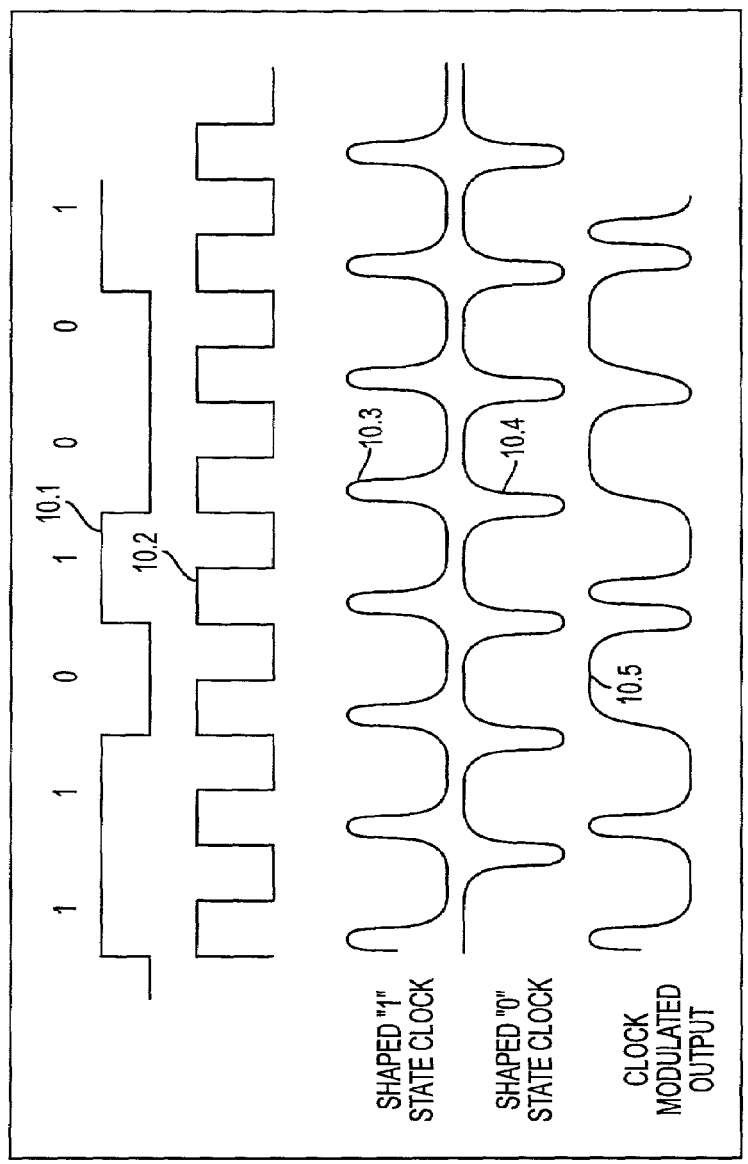
FIG. 10 shows a sample data pattern generated by another embodiment of this invention having Clock Shaped (CS) information content, whereby one of the clock states has a shaped "rounded-off" longer duration while the other clock has a shaped rounded off shorter duration.

FIG. 10 shows a data pattern 10.1 a pure clock pattern 10.2 and shaped asymmetrical clock patterns 10.3 and 10.4 generated by Clock Shape circuits of this invention. An illustrative resulting clock shaped selected output clock modulated signal is represented by clock signal 10.5.

Figure 11:
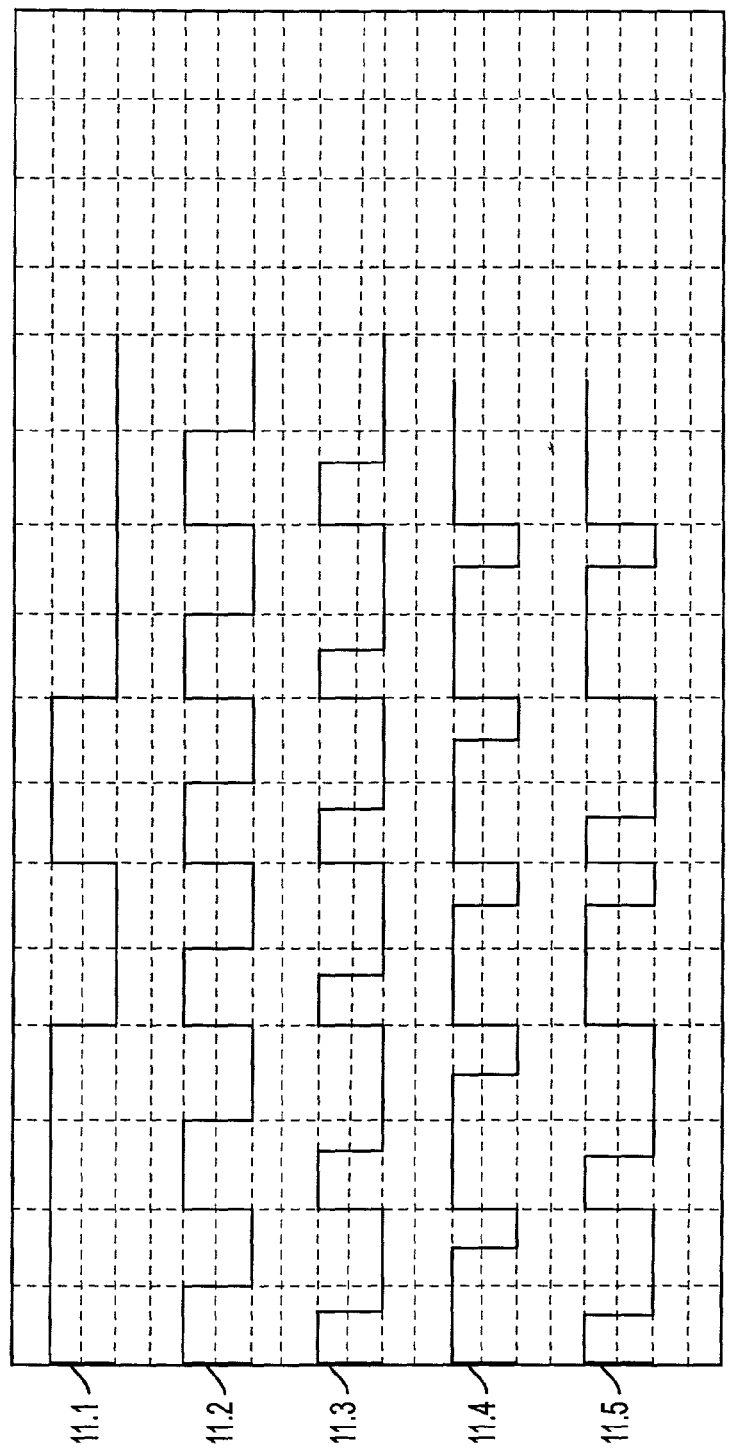
FIG. 11 shows a sample data information pattern the shorter clock high state represents the one (1) state, while the longer high state clock the zero (0) signal—information state.

FIG. 11 shows an illustrative input Data-In pattern 11.1, a pure clock pattern 11.2 and a Shorter and Longer Duration processed clock pattern 11.3 and 11.4 as well as the selected Converted Clock (CC) pattern 11.5 generated by one of the embodiments of this invention. In this case a data signal with a Shorter (S) falling edge distance from that of the rising clock edge represents the "1" state, while the "0" state has a larger (L) distance.

Figure 12:
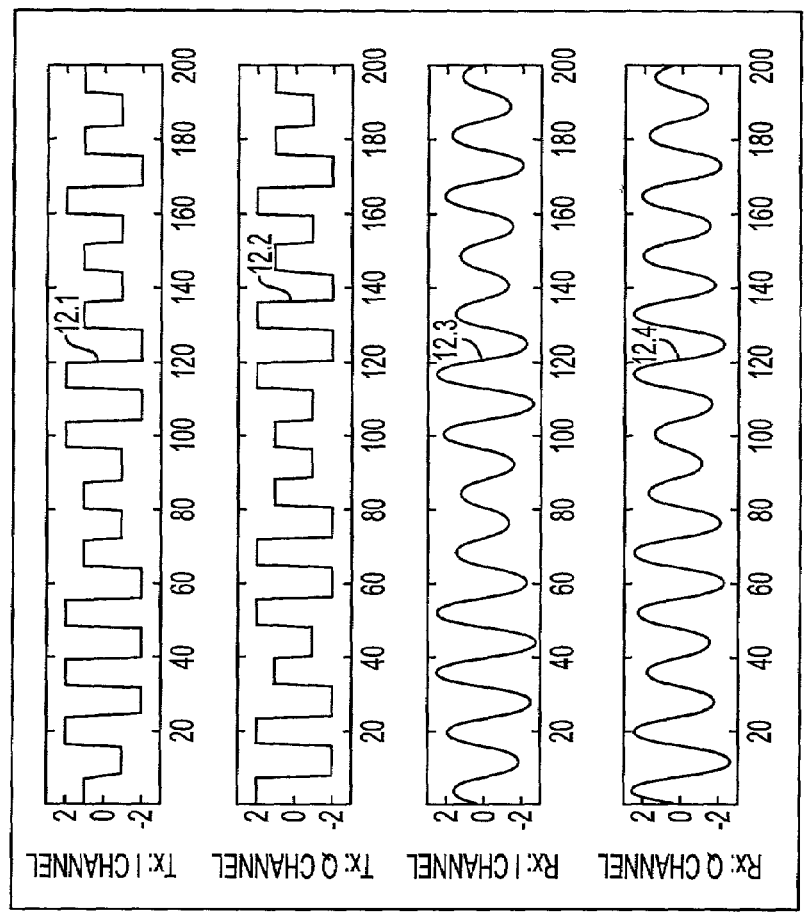
FIG. 12 illustrates a signal pattern whereby variable amplitude Clock Levels (CL) are used for the one and zero states of quadrature I and Q signal patterns.

FIG. 12 shows a shaped clock at the in-phase (I) and at the Quadrature Phase (Q) ports of an embodiment such as the embodiments of FIG. 6 and FIG. 7.

Figure 13:
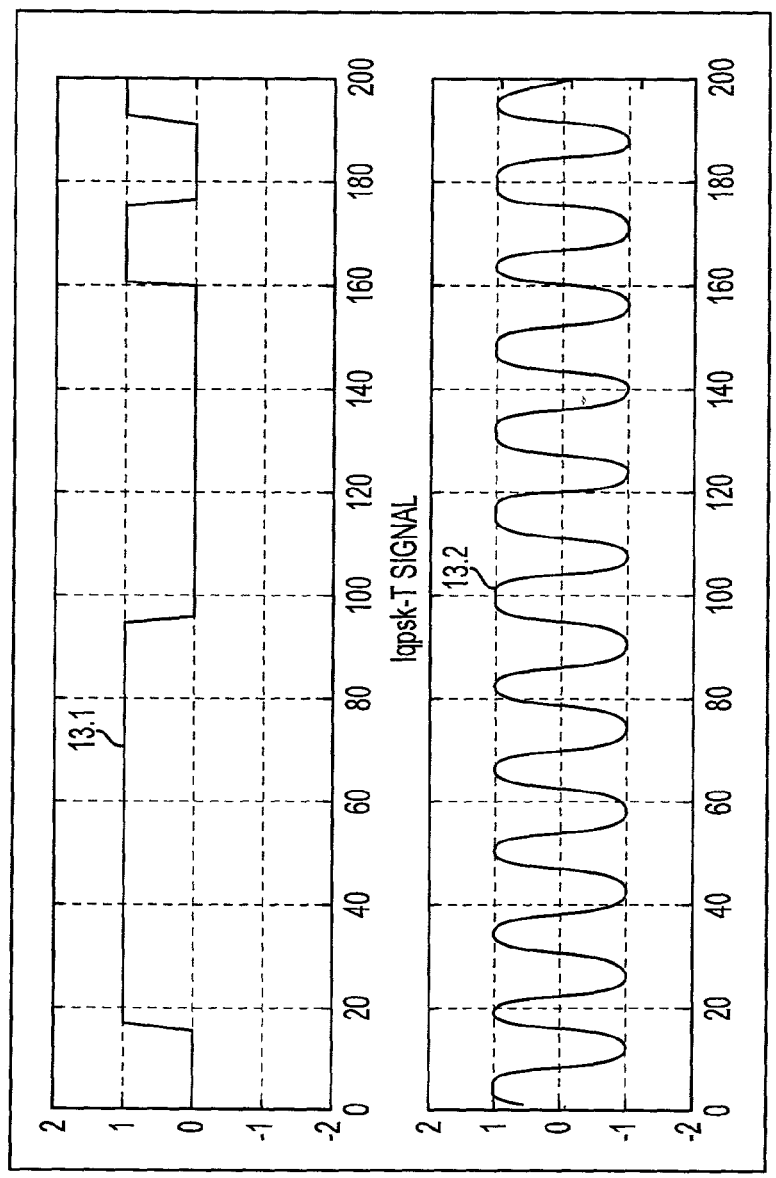
FIG. 13 shows a sample data pattern and the corresponding Clock Modulated (CM)—Clock Shaped (CS) baseband signal pattern, generated by one of the embodiments of this invention.

FIG. 13 shows a data pattern 13.1 and a corresponding shaped Clock Modulated (CM) signal pattern 13.2 generated by the designs of this invention.

Figure 14:
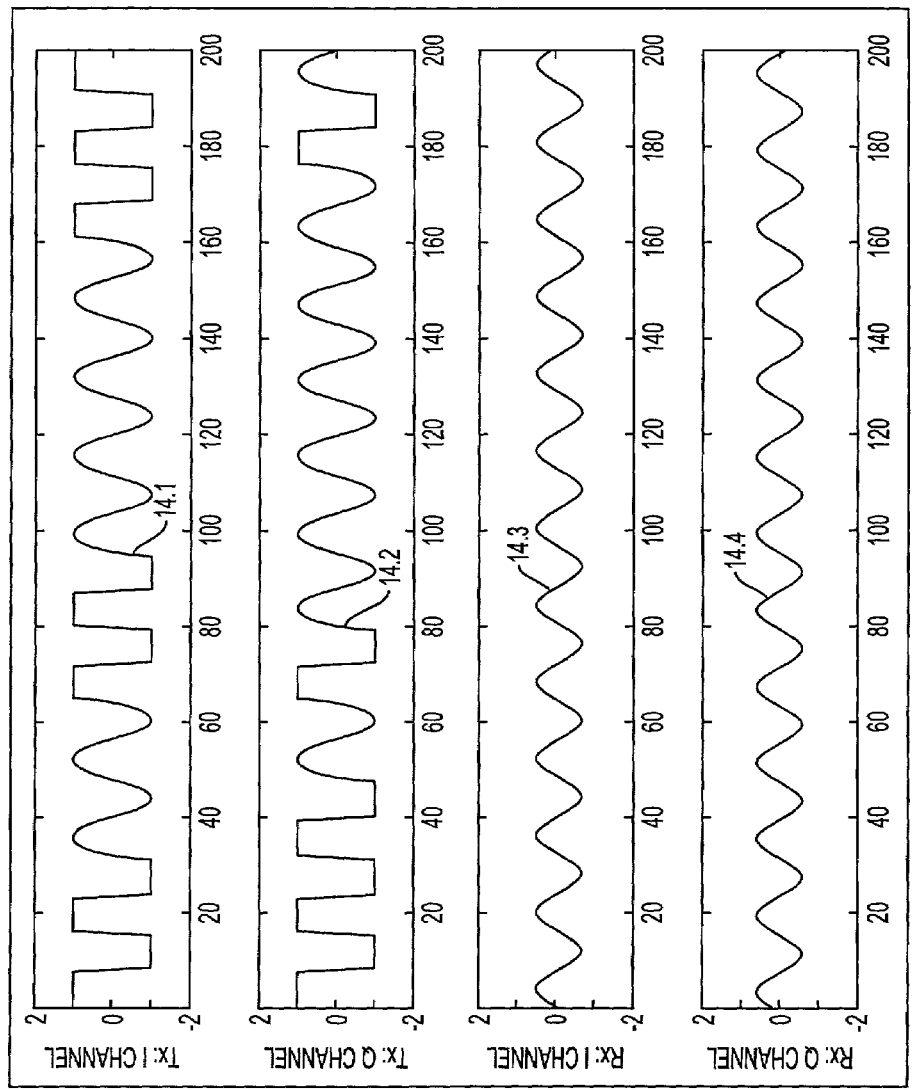
FIG. 14 depicts an in-phase (I) and a quadature-phase (Q) Clock Modulated (CM) signal pattern of this invention.

FIG. 14 shows alternate clock modulated data patterns 14.1 by embodiments of this invention to 14.4 at various ports of Quadrature I and Q modulator, generated and a corresponding shaped Clock Modulated (CM) signal pattern 13.2 generated by the designs of this invention.

Figure 15:
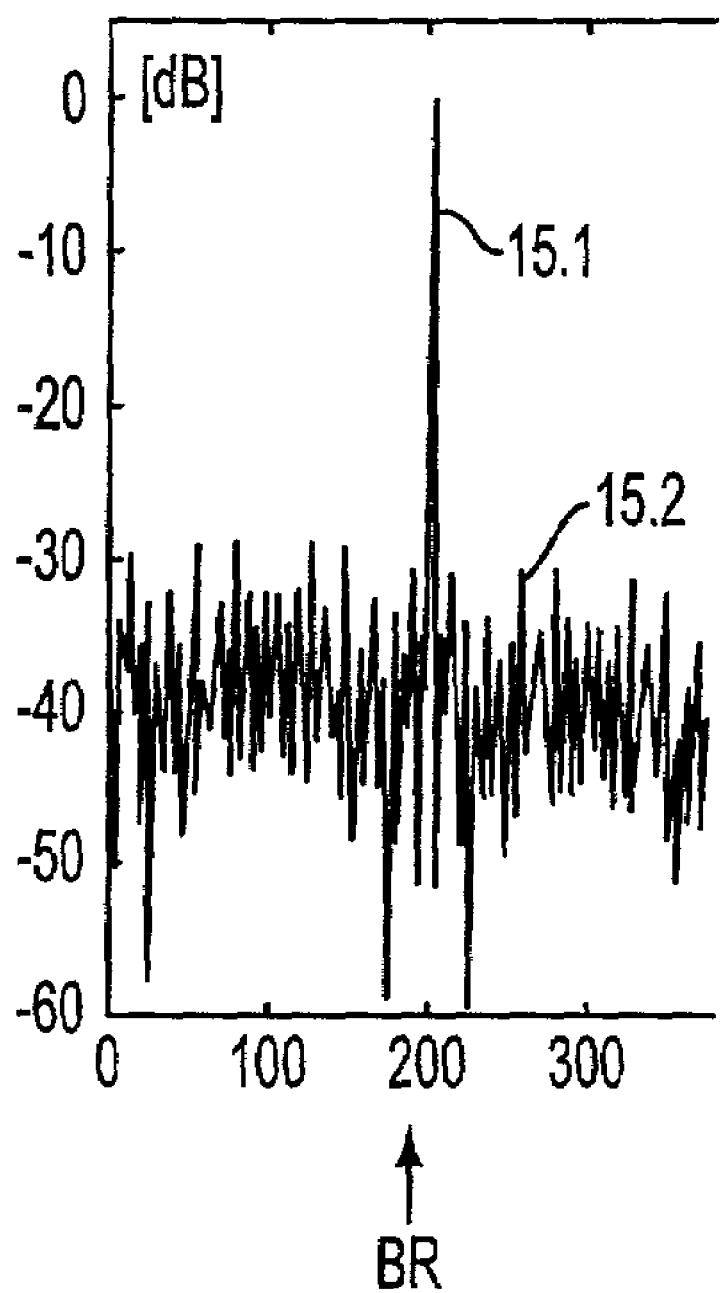
FIG. 15 shows an illustrative spectrum having an ultra high spectral efficiency.

FIG. 15 illustrates one of the ultra spectral efficient FK modulated signals which has a spectral efficiency of approximately 30 b/s/Hz up to the −28 dB power spectral density attenuation points.

Additional Description

Having now described numerous embodiments of the inventive structure and method in connection with particular figures or groups of figures, and having set forth some of the advantages provided by the inventive structure and method, we now highlight some specific embodiments having particular combinations of features. It should be noted that the embodiments described heretofore, as well as those highlighted below include optional elements or features that are not essential to the operation of the invention.

A first embodiment (1) provides a structure comprising a shaped clock signal generator means said shaped clock generator being synchronous or asynchronous with the data bit rate received by a data signal receive input port; and a data signal receiver port and processor for providing control signal generation means for selecting the said shaped clock signal for further transmission and/or modulation.

A second embodiment (2) provides a structure comprising a splitter receiving an input signal and splitting said input signal into two or more signal streams; a clock generator for receiving one of the said signal streams and generating a clock signal; one or more shaped clock generator means for receiving said clock signal and for generation of one or more shaped clock signals; a set of input ports for receiving shaped clock signals; a selector switch for selecting one of the shaped clock signals, said selector switch having an input interface port connected to the data-based selection control signals and another set of input ports connected to the shaped clock signals; and an output interface port coupled to said selector switch output.

A third embodiment (3) provides an architecture comprising a data interface input for receiving input data and for providing an input data-based clock selector data signal; a set of input ports for receiving a set of shaped clock signals and of not-shaped clock signals; a set of one or more clock generators which differ in one or more clock parameters from each other; a selector switch for selecting one of the processed clock signals; and a data interface output port for receiving said selected signal and providing it to the transmitter circuitry.

A fourth embodiment (4) provides a structure comprising a clock generator which provides clock signals to two or more clock transition time shifting and clock shaping signal generators; a data input port and connection to a data interface input encoder for the generation of clock selector data signal by said data input interface encoder; a switch to choose, based on said clock selector data signal, one of the clock transition time-shifted shaped clock signals and connect the selected signal to the data interface output unit; and a data interface output unit for connecting the selected signal to the transmission medium or further signal processing.

A fifth embodiment (5) provides a transmit signal processor structure comprising a first clock signal generator having a first set of clock shaping parameters; a second clock signal generator having a second set of clock shaping parameters, said second set of clock shaping parameters having at least one parameter different from that of the first set of clock signal shaping parameters; a data input receive circuitry and processor for selection of one of the said first or second clock shaped signals; a switch for switching between the first set and second set of shaped clock parameters; and an output interface port to provide the selected signal to the transmission medium.

A sixth embodiment (6) provides a spectral saving data and clock signal processing system comprising data signal and clock signal processing means to provide a clock modulated signal having changeable distances between the rising edges and falling edges of the modulated clock signals; control means having its input connected to the data signal source and its output connected to edge distance switch selection means; and digital interface output means to connect the clock modulated signal to the interface of the subsequent signal processor.

A seventh embodiment (7) provides a clock signal modulator comprising a data input interface means to provide data signals to an asynchronous pure clock source; an asynchronous pure clock generator means to provide a pure clock signal; and a selector switch means which is controlled by the data interface means to provide a shorter distance between the falling edge and rising edge of the clock modulated signal for a zero state data signal and a longer distance between the falling edge and rising edge of the clock modulated signal for a one-state data signal.

An eighth embodiment (8) provides a clock converter system comprised of: an input data interface means for controlling the selection process of the shaped clock signal which is provided to the interface output unit means; a clock signal shaping means to provide smoothed continuous clock signals to the clock signal selection means having one or more different clock signal parameters; and an output signal processing means to accept the smoothed different clock signal parameter processed clock converted signals.

A ninth embodiment (9) provides a clock modulated signaling system comprising an input data interface means to provide control signal generation and selection means of shaped clock signals; an interface means to provide signal processing means for modulating the clock modulated baseband signal by means of a cross-correlated quadrature modulator system; an output amplifier means to connect the cross-correlated quadrature modulated signal to the transmission medium; demodulation means to demodulate the received quadrature modulated signal; and signal processor means to decode and regenerate the clock modulated signal.

A tenth embodiment (10) provides an architecture comprising a data interface input for receiving input data and for providing an input data-based clock selector data signal; a set of input ports for receiving a set of shaped clock signals and of not-shaped clock signals; a set of one or more clock generators which differ from each other in one or more clock parameters; a selector switch for selecting one of the processed clock signals; and a data interface output port for receiving said selected signal and providing it to the transmitter circuitry.

An eleventh (11) embodiment provides a method comprising steps: receiving a data signal; generating a shaped clock signal in response to the received data signal; generating a control signal for selecting the generated shaped clock signal; and processing the selected shaped clock signal for transmission or modulation. A twelfth (12) embodiment further provides that the shaped clock signal is generated synchronously with a data bit rate of the received data signal. A thirteenth (13) embodiment alternatively provides that the shaped clock signal is generated asynchronously with a data bit rate of the received data signal.

A fourteenth (14) embodiment provides a method of signaling using clock modulated signals, the method comprising: selecting at least one shaped clock signal; cross-correlating and quadrature modulating the selected at least one shaped clock signal; amplifying the cross-correlated quadrature modulated signal; transmitting the amplified cross-correlated quadrature modulated signal; receiving the transmitted amplified cross-correlated quadrature modulated signal; demodulating the received signal; and decoding the received demodulated signal and regenerating the clock signal.

Other embodiments provide methods that implement and/or effectuate the processing performed by the above described structures, and yet other embodiments provide computer programs and computer program products that embody the inventive methods.

The foregoing descriptions of specific embodiments of the present invention have been presented for purposed of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A clock modulated signaling system comprising:
   an input data interface means to provide control signal generation and selection means of shaped clock signals;
   a quadrature modulator for quadrature modulating the shaped clock baseband signal;
   an interface means to provide signal processing means for modulating the clock modulated baseband signal by means of a cross-correlated quadrature modulator system;
   an output amplifier means to connect the cross-correlated quadrature modulated signal to the demodulator;
   demodulation means to demodulate the received quadrature modulated signal; and
   signal processor means to decode and regenerate the shaped clock signals.

2. A method of signaling using clock modulated signals, said method comprising:
   selecting at least one shaped clock signal;
   cross-correlating and quadrature modulating said selected at least one shaped clock signal;
   amplifying said cross-correlated quadrature modulated signal;
   transmitting said amplified cross-correlated quadrature modulated signal;
   receiving said transmitted amplified cross-correlated quadrature modulated signal;
   demodulating said received signal; and
   decoding said received demodulated signal and regenerating said clock signal.

* * * * *